US 6,707,613 B2

(12) United States Patent
Fujimoto et al.

(10) Patent No.: US 6,707,613 B2
(45) Date of Patent: Mar. 16, 2004

(54) LENS ARRAY UNIT AND METHOD OF FORMING IMAGE

(75) Inventors: Hisayoshi Fujimoto, Kyoto (JP); Toshihiko Takakura, Kyoto (JP); Norihiro Imamura, Kyoto (JP); Minori Torama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 73 days.

(21) Appl. No.: 09/823,762

(22) Filed: Apr. 3, 2001

(65) Prior Publication Data

US 2001/0028506 A1 Oct. 11, 2001

(30) Foreign Application Priority Data

Apr. 5, 2000 (JP) .................................. 2000-103717
Apr. 6, 2000 (JP) .................................. 2000-104752
Oct. 13, 2000 (JP) .................................. 2000-312918

(51) Int. Cl.$^7$ ............................................. G02B 27/10
(52) U.S. Cl. ....................................... 359/622; 359/619
(58) Field of Search ............................ 359/619, 620, 359/622, 621, 623, 624, 738; 353/32

(56) References Cited

U.S. PATENT DOCUMENTS 3,357,772 A * 12/1967 Rowland .................. 359/619
3,706,486 A * 12/1972 de Montebelle ............ 359/619
3,733,976 A * 5/1973 Dietch ..................... 396/546
5,636,056 A * 6/1997 Itonaga et al. ............. 359/601
5,648,874 A * 7/1997 Sawaki et al. ............. 359/622
5,973,844 A * 10/1999 Burger ..................... 359/622
6,373,635 B1 * 4/2002 Fujimoto et al. .......... 359/619
6,449,099 B2 * 9/2002 Fujimoto et al. .......... 359/621
2003/0021034 A1 * 1/2003 Yoshikawa et al. ........ 359/619

FOREIGN PATENT DOCUMENTS

JP          11-23805       1/1999       ............ G02B/3/00

* cited by examiner

*Primary Examiner*—Ricky Mack
(74) *Attorney, Agent, or Firm*—Michael D. Bednarek; Shaw Pittman LLP

(57) ABSTRACT

A lens array unit includes first and second lens arrays cooperative with each other. The first lens array is provided with a plurality of first convex lenses and a first transparent holder formed integral with the first lenses. Each of the first lenses has first and second lens surfaces. The second lens array is provided with a plurality of second convex lenses and a second transparent holder formed integral with the second lenses Each of the second lenses has third and fourth lens surfaces. The second lens array is attached to the first lens array so that the third lens surfaces face the second lens surfaces. The lens array unit further includes a light shield mounted on the first lens array. The light shield is formed with a plurality of through-holes each facing the relevant one of the first lens surfaces.

17 Claims, 27 Drawing Sheets

LENS ARRAY UNIT AND METHOD OF FORMING IMAGE

BACKGROUND OF THE INVENTION

1. Field of the Invention

The present invention relates to a lens array unit which may include one or more lens arrays used in an image reading apparatus for example. It also relates to a method of forming an image of an object to be read out.

2. Description of the Related Art

An image reading unit, incorporated in e.g. a facsimile machine, may be provided with an array of light receiving elements and with a lens array for focusing the light reflected on a document onto the light receiving elements. A typical example of a conventional lens array is shown in FIGS. 29 and 30 of the accompanying drawings. The illustrated lens array 9 includes a plurality of rod lenses (self-focusing lenses) 91 arranged in a line, and a resin holder 90 for holding the rod lenses 91. Each of the rod lenses 91 has a pair of flat lens surfaces 91a–91b, and its refractive index varies in accordance with the distance from the central axis. Thus, as shown in FIG. 30, light passing through the rod lens 91 follows a meandering path, whereby the image of an object (b→a) is projected in a non-inverting and non-magnifying manner (b'→a').

The lens array 9 may be fabricated in the following manner. First, the rod lenses 91 are produced. Then, the holder 90 is made of a resin material, with the rod lenses 91 embedded therein.

Disadvantageously, the lens array 9 is rather expensive since the rod lenses 91, having the above-described special optical properties, are difficult to produce. Further, the productivity of the lens array 9 tends to be low due to the separate preparation and the subsequent assembling of the rod lenses 91 and the holder 90.

SUMMARY OF THE INVENTION

The present invention has been proposed under the circumstances described above. It is, therefore, an object of the present invention to make it possible to form a true image of an object with simpler and less expensive optical means than is conventionally possible.

According to a first aspect of the present invention, there is provided a lens array unit which comprises: a first lens array provided with a plurality of first convex lenses and a first transparent holder formed integral with the first lenses, each of the first lenses having first and second lens surfaces; a second lens array provided with a plurality of second convex lenses and a second transparent holder formed integral with the second lenses, each of the second lenses having third and fourth lens surfaces, the second lens array being attached to the first lens array so that the third lens surfaces face the second lens surfaces; and a light shield mounted on the first lens array and provided with a plurality of through-holes facing the first lens surfaces.

In this specification, a 'convex' lens refers to a lens including at least one convex lens surface. Thus, the other lens surface opposite to this convex lens surface maybe convex, flat or concave.

According to the present invention, each of the first and the second lens arrays can be readily produced by a conventionally known molding technique. In particular, each lens of the first or second lens array of the present invention is a simple convex lens, instead of a self-focusing lens which is rather expensive and difficult to fabricate. Thus, the lens array unit of the present invention is more readily made at a lower cost than the conventional rod lens array.

Preferably, the first and second lens arrays may cooperate to form a non-inverted and non-magnified image of an object. In this specification, 'non-magnified' means that the size of the projected image of the object is equal to the original size of the object.

Preferably, each of the through-holes may have a dark-colored inner wall surface. Advantageously, the inner wall surface is black. Simply, the light shield as a whole may be made of a dark-colored resin material.

For positioning purposes, the light shield and the first lens array may be provided with engaging means including a recess and a projection fitted into the recess.

Preferably, the light shield may be attached to the first lens array in a stretched state, so that the light shield is held in proper contact with the first lens array.

In a preferred embodiment, the light shield may include a plurality of segments connected to extend in a predetermined direction. Advantageously, any adjacent segments may overlap with each other in their thickness direction for preventing the passage of stray light. All of the segments may be equal in configuration and size to each other, considering the efficiency of production.

Preferably, each of the first lens surfaces may be convex and at least partially project into a relevant one of the through-holes of the light shield. In this manner, the alignment of the first lens array and the light shield is facilitated. Further, the positional deviation of the first lens array relative to the light shield is effectively prevented.

Preferably, the first lens surfaces may be diametrically greater than the through-holes of the light shield. With this arrangement, each first lens surface can be maintained in proper facing relation to the appropriate through-hole even if the first lens array and the light shield are slightly displaced relative to each other.

According to a second aspect of the present invention, use may be made of only one lens array for providing a lens array unit. In this case, the lens array unit may comprise: a lens array provided with a plurality of lenses and a transparent holder formed integral with the lenses, each of the lenses having first and second lens surfaces; and a light shield formed with a plurality of through-holes facing the first lens surfaces.

According to a third aspect of the present invention, there is provided a lens array unit comprising: a first lens array provided with a plurality of first convex lenses arranged in a line, each of the first lenses having first and second lens surfaces; a second lens array provided with a plurality of second convex lenses arranged in a line, each of the second lenses having third and fourth lens surfaces, the second lens array being attached to the first lens array so that the third lens surfaces face the second lens surfaces; and light shielding means for partially covering at least either one of the third and the fourth lens surfaces of each second lens.

Preferably, the light shielding means may comprise a dark-colored layer formed directly on at least either one of the third and the fourth lens surfaces of each second lens.

Preferably, the first lens array may be formed with grooves for optically separating the first lenses from each other. Advantageously, each of the grooves may be provided with a dark-colored light shielding member. The light shielding member may be a black layer covering the inner wall surfaces of each light separation groove, or black material filled in the light separation groove.

Preferably, each of the first and the second lens arrays may include a transparent holder formed integral with the lenses. The holder of the first lens array may include obverse and reverse surfaces spaced from each other in an axial direction of the first lenses, wherein the obverse and the reverse surfaces are covered with light shielding means.

Similarly, the holder of the second lens array may include obverse and reverse surfaces spaced from each other in an axial direction of the second lenses, wherein at least either one of the obverse and the reverse surfaces is covered with light shielding means.

According to a fourth aspect of the present invention, there is provided a lens array comprising: a plurality of lenses arranged in a line and each having a lens surface; and light shielding means for partially covering the lens surface. The lens surface may include peripheral portions spaced from each other along the above-mentioned line, wherein the light shielding means covers the peripheral portions.

According to a fifth aspect of the present invention, there is provided a method of forming an image of an object. The method may comprise the steps of: preparing a lens array unit which includes a first lens array provided with first lenses and a second lens array provided with second lenses, the first lens array being arranged closer to said object than the second lens array is, each of the second lenses having a light inlet surface and a light outlet surface; and partially shielding at least either one of the light inlet surface and the light outlet surface for adjusting brightness of light spots formed along a predetermined focal line.

Other features and advantages of the present invention will become apparent from the detailed description given below with reference to the accompanying drawings.

DETAILED DESCRIPTION OF THE PREFERRED EMBODIMENTS

The preferred embodiments of the present invention will be described below with reference to the accompanying drawings.

Figure 1:
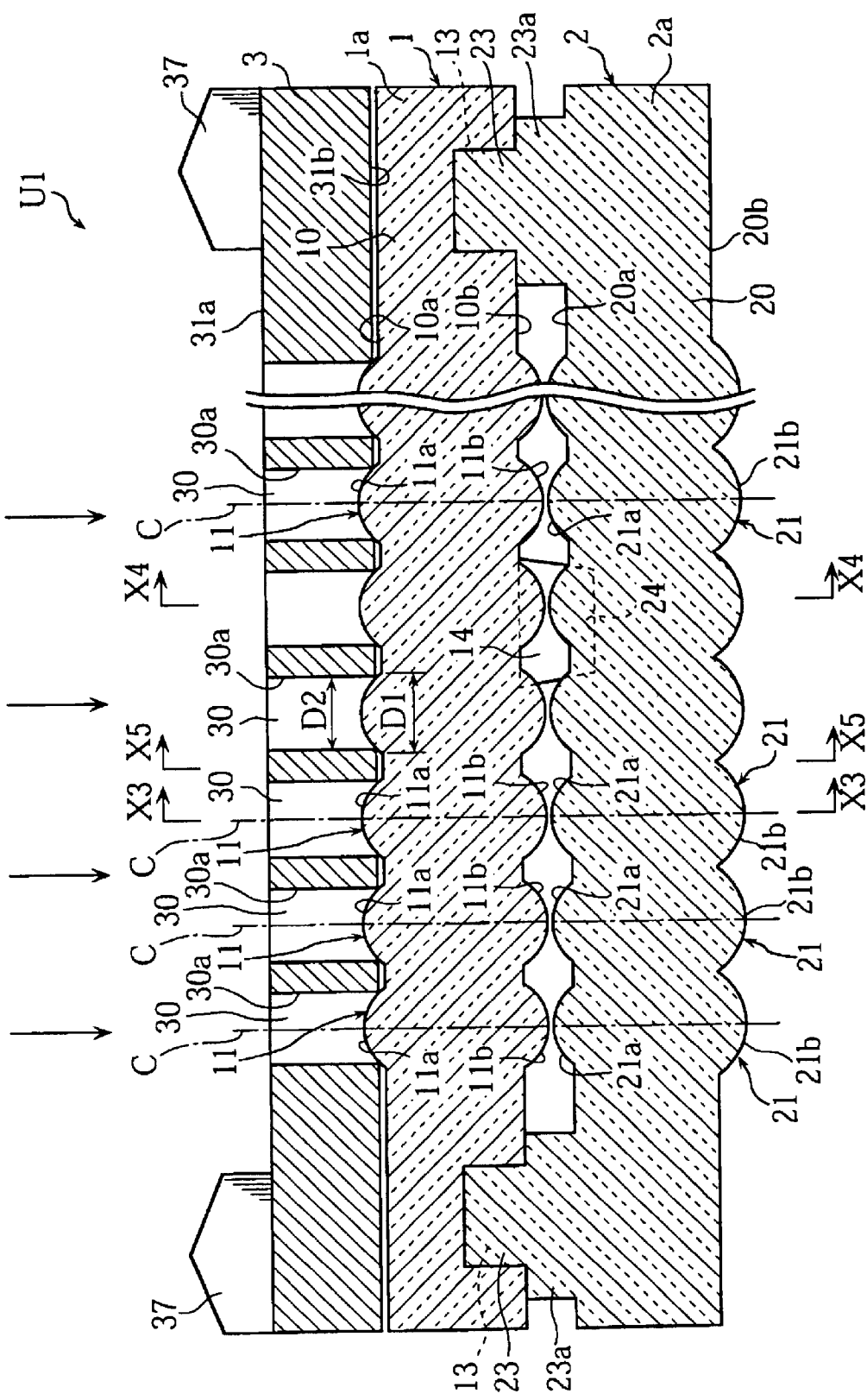
FIG. 1 is a sectional view showing a lens array unit according to a first embodiment of the present invention.
Figure 2:
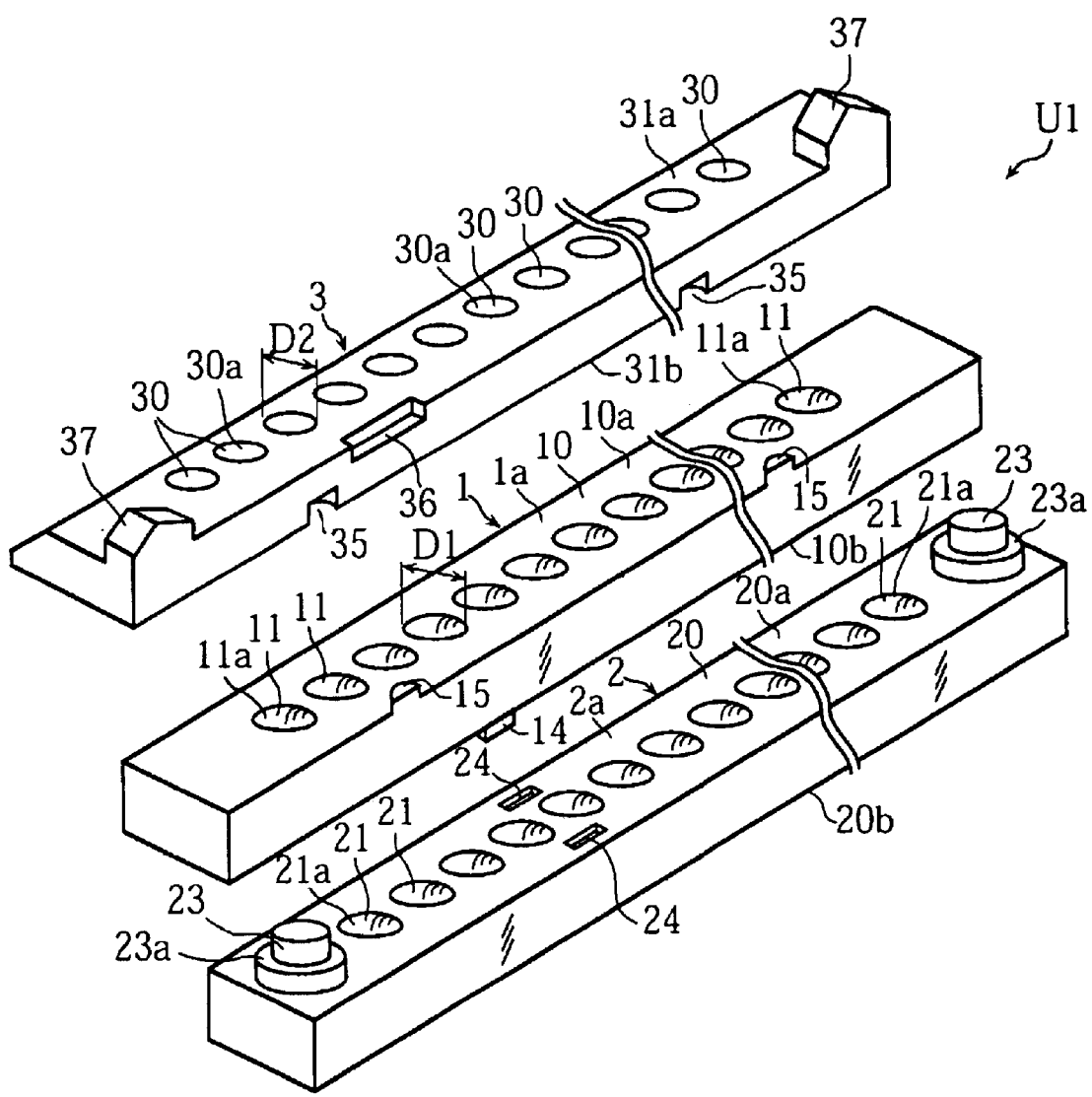
FIG. 2 is an exploded view showing the main components of the lens array unit of the first embodiment.

Reference is first made to FIGS. 1–5 illustrating a lens array unit U1 according to a first embodiment of the present invention. As best shown in FIGS. 1 and 2, the lens array unit U1 includes a first lens array 1, a second lens array 2 and a light shield 3.

The first lens array 1 is provided with an elongated transparent body 1a which includes a plurality of first lenses 11 and a first holder 10 formed integral with the lenses 11. The first lenses 11 are arranged at regular intervals in a line extending longitudinally of the lens array body 1a. Similarly, the second lens array 2 is provided with an elongated transparent body 2a which includes a plurality of second lenses 21 and a second holder 20 formed integral with the lenses 21. The second lenses 21 are also arranged in a line, at the same regular intervals as the first lenses 11. The two lens array bodies 1a, 2a are made of a transparent resin material such as PMMA (polymethylmethacrylate) or PC (polycarbonate).

Each of the first lenses 11 is symmetrical with the optical axis C, and has a convex first lens surface 11a and a convex second lens surface 11b. Similarly, each of the second lenses 21 is symmetrical with its optical axis (which coincides with the optical axis C of a cooperative one of the first lenses 11), and has a convex third lens surface 21a and a convex fourth lens surface 21b. The curvatures of the respective lens surfaces 11a–11b and 21a–21b are so determined that the lens array unit U1 forms the image of an object in a non-inverting and non-magnifying manner, as will be described later. Each lens surface may be spherical or aspherical. A spherical lens surface can be formed more easily than an aspherical one. However, an aspherical lens surface is advantageous to reducing an aberration. For obtaining a non-inverted and non-magnified image, all of the first to the fourth lens surfaces may not necessarily be convex. For instance, the second lens surface 11b may be made flat, whereas the first lens surface 11a may be convex.

The pitch between the adjacent first lenses 11 or second lenses 21 may be about 1 mm. The diameter of each lens surface may be in a range of 0.6–1.0 mm. In the illustrated embodiment, the first lens surface 11a is smaller in diameter than the second lens surface 11b, and the second lens surface 11b is generally equal to the third lens surface 21a which is smaller than the fourth lens surface 21b (hence, in diameter, the first lens surface 11a<the second lens surface 11b=the third lens surface 21a<the fourth lens surface 21b). The adjacent first lens surfaces 11a are spaced from each other, as shown in FIG. 1, and so are the second and the third lens surfaces 11b, 21a. On the other hand, each of the fourth lens surfaces 21b is held in contact with the adjacent ones.

For properly positioning the first and the second lens arrays 1, 2 relative to each other, the first holder 10 is formed with an underside hole 13 at each end, while the second holder 20 is formed with a projection 23 to be fitted into the hole 13 of the first holder 10. The projection 23 is provided with a diametrically larger portion 23a, so that the first and the second lens arrays 1 and 2, when combined, are spaced from each other by an appropriate distance.

In addition to the positioning holes 13 and the cooperative projections 23, the first lens array 1 is provided with a pair of downward projections 14 (see FIGS. 2 and 4), while the second lens array 2 is provided with a pair of recesses 24 to engage the projections 14. With such an arrangement, the positioning of the first and the second lens arrays 1, 2 is more accurately performed.

As best shown in FIG. 2, the light shield 3 has an elongated configuration as in the first and the second lens arrays 1, 2. The light shield 3 is made of black ABS (acrylonitrile-butadiene-styrene) resin. The light shield 3 is formed with a plurality of linearly arranged through-holes 30 corresponding in position to the first and second lenses 11, 21. Since the light shield 3 is made of a black material, the inner wall surface 30a of each through-hole 30 is also black.

Figure 3:
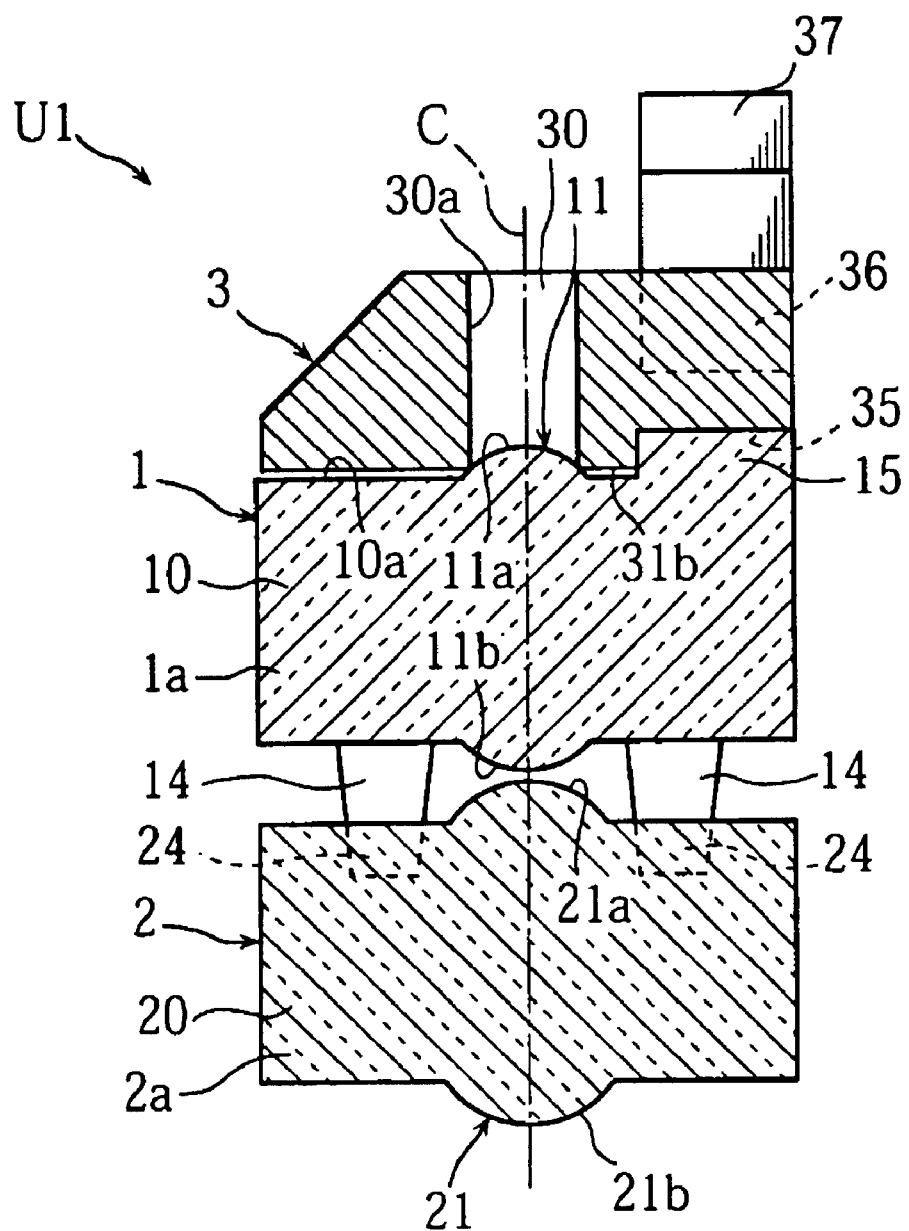
FIG. 3 is a sectional view taken along lines X3—X3 in FIG. 1.
Figure 4:
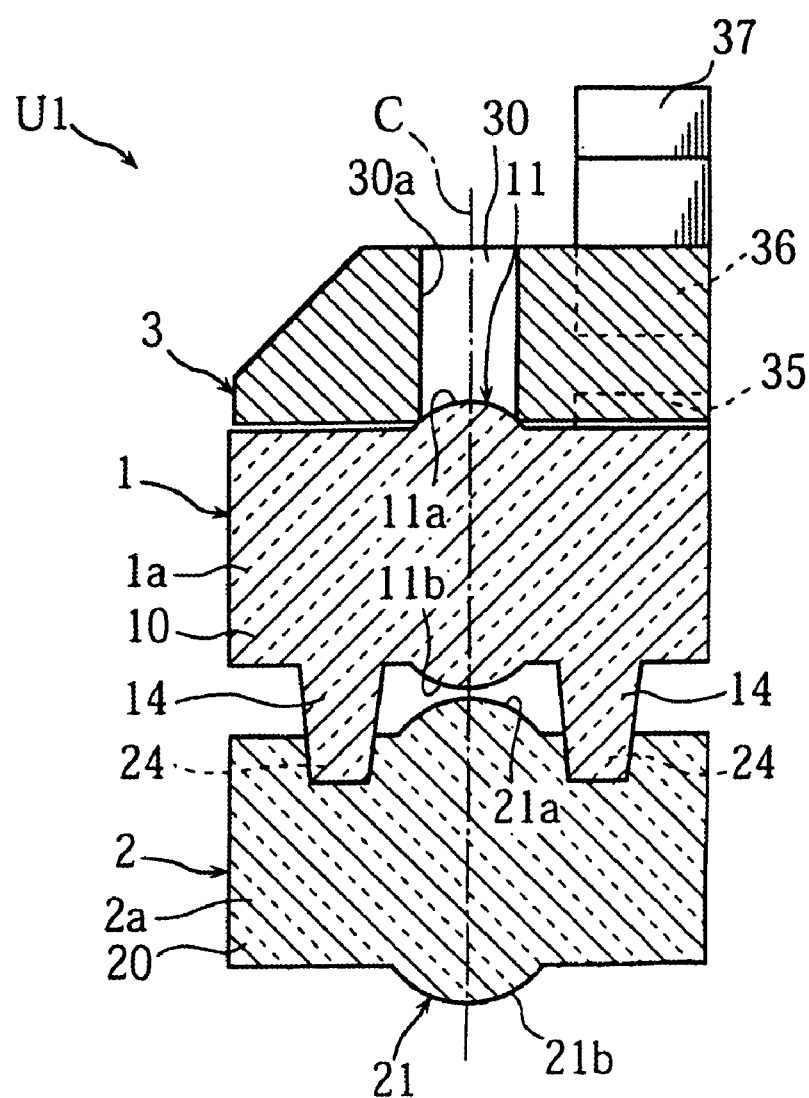
FIG. 4 is a sectional view taken along lines X4—X4 in FIG. 1.
Figure 5:
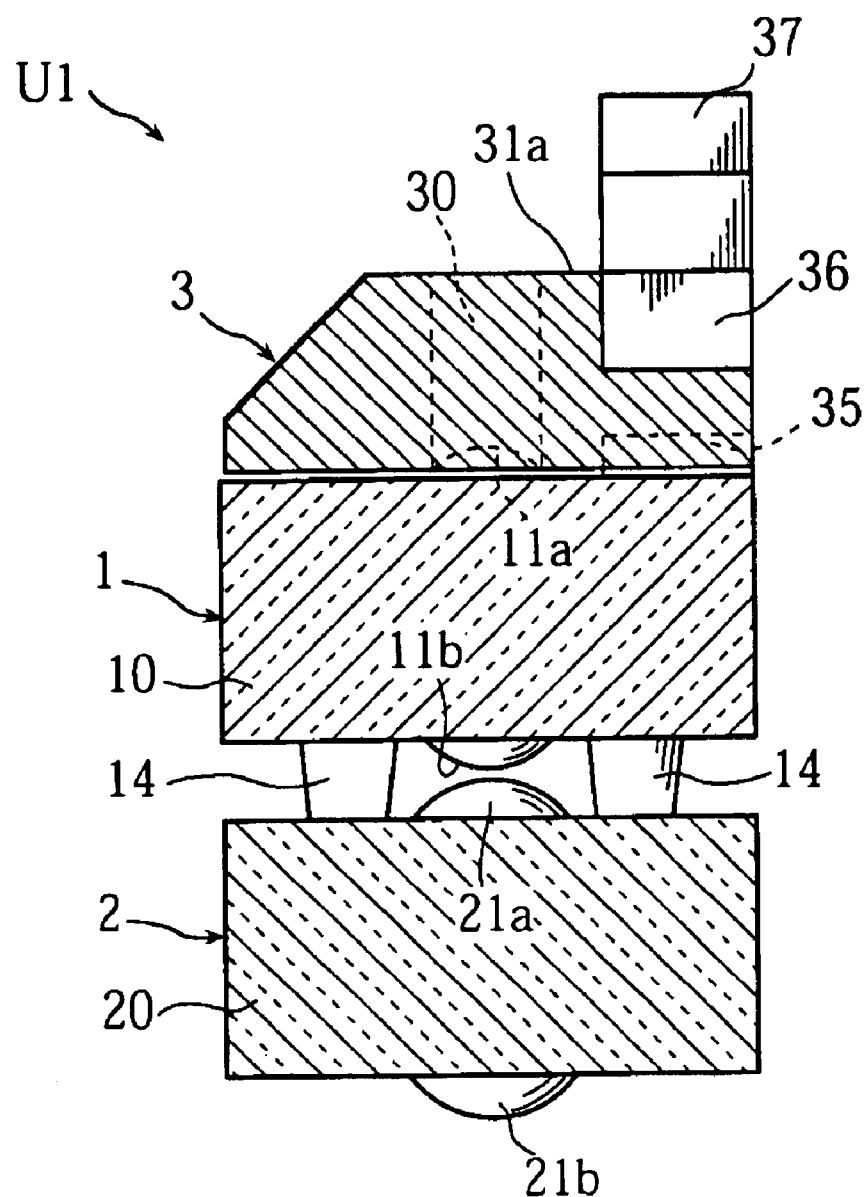
FIG. 5 is a sectional view taken along lines X5—X5 in FIG. 1.

The light shield 3 is formed, in its bottom surface 31b, with positioning recesses 35 spaced from each other in the longitudinal direction of the light shield 3. Correspondingly, the holder 10 of the first lens array 1 is formed, in its upper surface 10a, with projections 15 to be fitted into the positioning recesses 35 of the light shield 3 (see FIG. 3). When the light shield 3 is attached to the first lens array 1, each of the first lens surfaces 11a partially protrudes into the relevant through-hole 30, as shown in FIGS. 1 and 3, since the diameter D2 of the through-hole 30 is smaller than the diameter D1 of the first lens 11.

Since the light shield 3 is made of ABS resin, the shield 3 is longitudinally expandable. When attached to the first lens array 1, the light shield 3 is slightly stretched in its longitudinal direction, which is advantageous to maintaining the light shield 3 in proper contact with the first lens array 1. This stretched condition is maintained by the engagement between the above-mentioned positioning recesses 35 of the light shield 3 and the cooperative projections 15 of the first lens array 1. When the light shield 3 is thus expanded, the pitch of the through-holes 30 may be altered. However, the variation of pitch is negligible, whereby there may be no need to consider this variation in designing the light shield 3.

As shown in FIG. 2, the light shield 3 is formed, in its upper surface 31a, with a recess 36 disposed at one longitudinal edge. Also, an upward projection 37 is formed at each end. The function of the recess 36 and the projections 37 will be described later.

The above-described lens arrays 1, 2 and the light shield 3 may be fabricated in the following manner.

Figure 6:
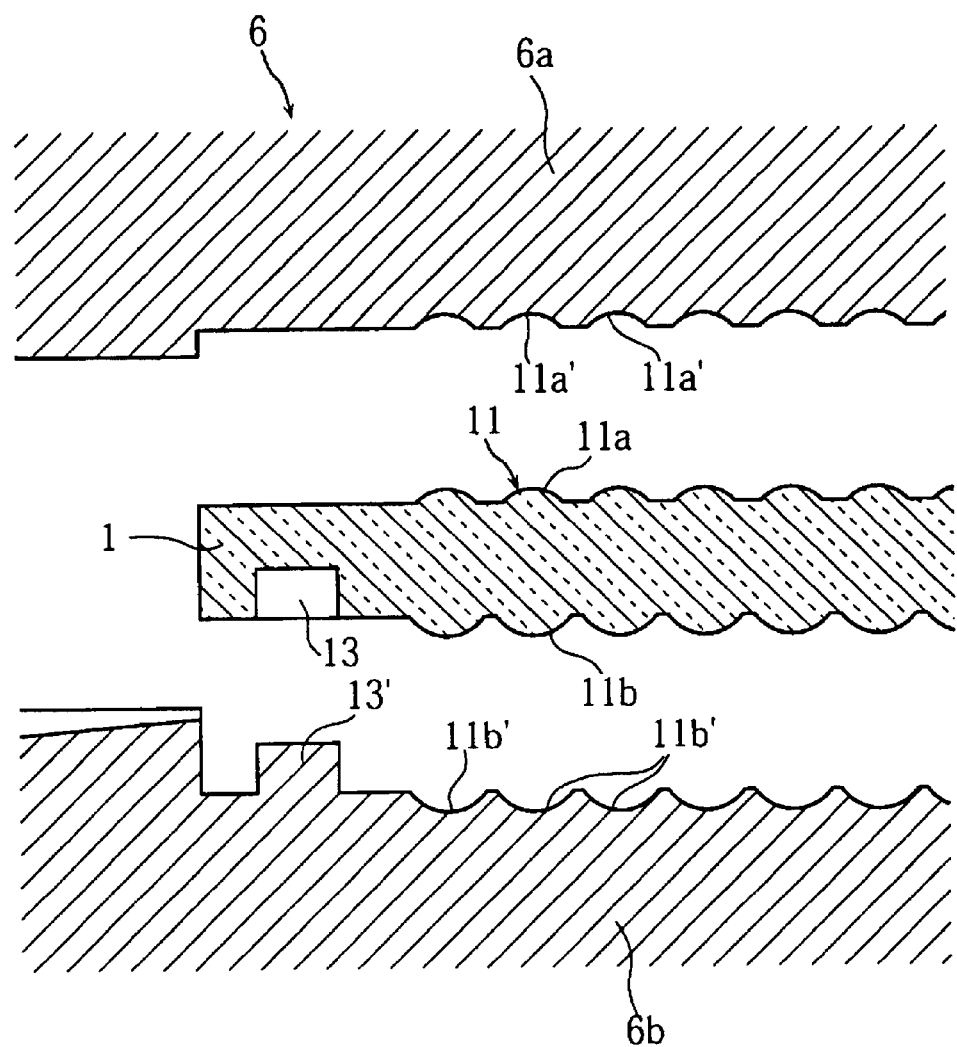
FIG. 6 illustrates how the transparent body of a lens array of the first embodiment is fabricated.

Referring to FIG. 6, a mold 6 consisting of an upper member 6a and a lower member 6b are used to make the first lens array 1. A molten resin material is poured into the cavity defined by the upper and the lower members 6a–6b, and is allowed to solidify. Then, the hardened product is taken out from the mold 6.

As illustrated, the upper and the lower members 6a–6b are formed with a plurality of recesses 11a', 11b' corresponding to the first and the second lens surfaces 11a, 11b, and with protrusions 13' corresponding to the positioning holes 13. It is possible to form more than one lens array 1 collectively when the mold 6 is arranged to define a plurality of identical cavities configured in accordance with the lens array 1.

As readily understood, the second lens array 2 may be formed in the same manner using an appropriately configured mold.

The light shield 3 may also be fabricated by molding. The through-holes 30 may be formed in the molding process, or be formed after the prototype of the light shield 3 has been prepared. In the latter case, mechanical processing or laser beam machining may be used for forming the through-holes 30 in the prototype of the light shield 3.

After the two lens arrays 1, 2 and the light shield 3 are prepared, they are combined into one unit. Specifically, the first and the second lens arrays 1, 2 are attached to each other by fitting the projections 23 and the projections 14 into the holes 13 and the recesses 24, respectively (see FIGS. 1 and 2). The light shield 3 and the first lens array 1 are attached to each other by fitting the projections 15 into the recesses 35 (see FIGS. 2 and 3). In this manner, the lens array unit U1 of the present invention is obtained more readily than the conventional rod lens array in which many small rod lenses need to be prepared separately from the holder, and then the lenses should be embedded in the holder.

Figure 7:
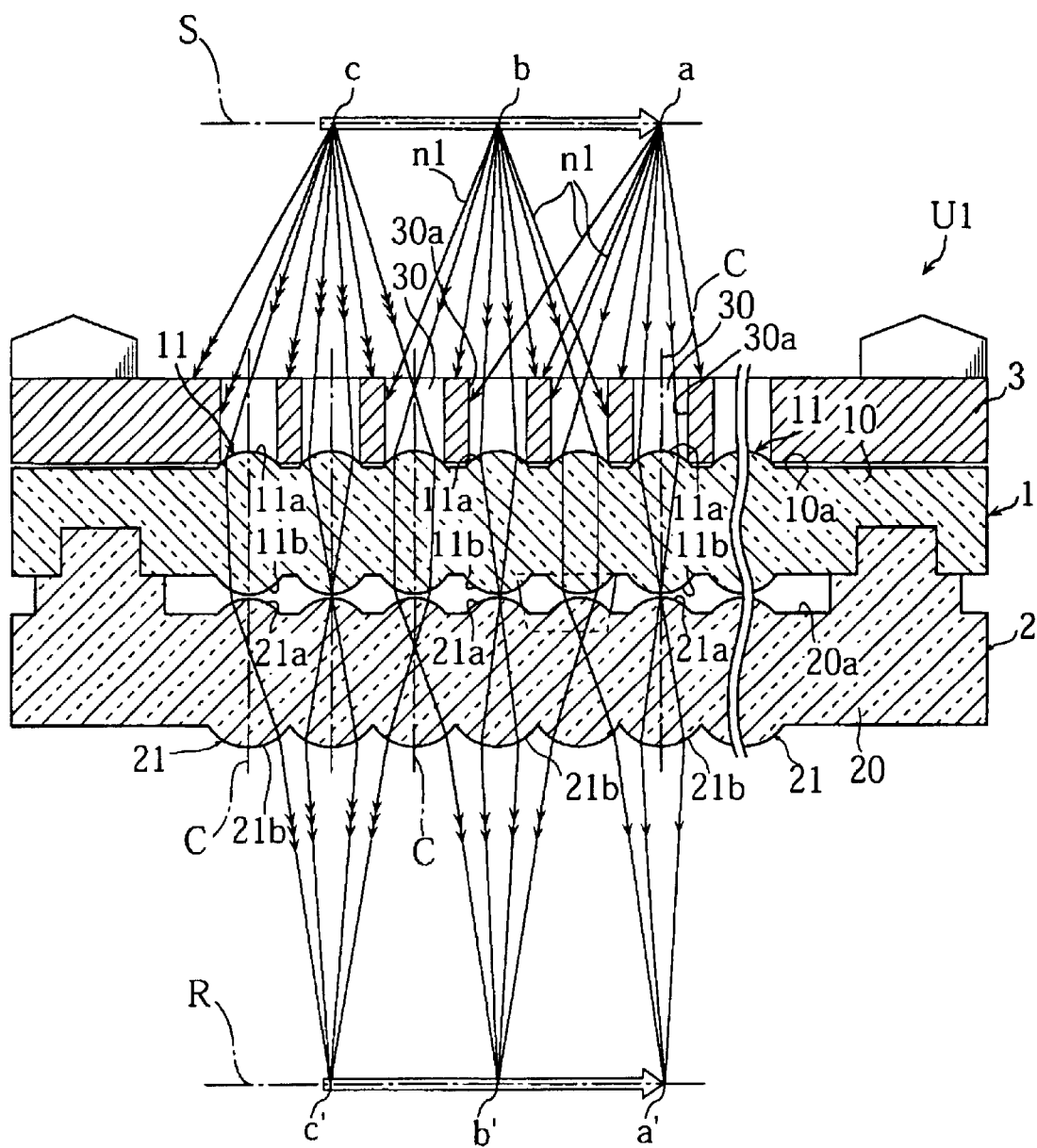
FIG. 7 illustrates the function of the lens array unit of the first embodiment.

FIG. 7 illustrates the function of the lens array unit U1. When an object (c→b→a) laid at a position S is illuminated, the light reflected on the object will partly pass through the through-holes 30 of the light shield 3 and partly be blocked by the light shield 3. The light passing through the holes 30 then enters the first lenses 11 and the second lenses 21, to converge at a position R. In this process, the cooperation of the first and the second lenses 11, 21 makes the image of the object (c→b→a) be first contracted and inverted, and then be expanded and inverted again. Thus, the non-inverted and non-magnified image (c'→b'→a') of the object is formed at the position R.

The presence of the light shield 3 is advantageous to preventing the light reflected on the object (c→b→a) from entering the holder 10 of the first lens array 1 (and hence from entering the holder 20 of the second lens array 2). In other words, the light reflected on the object (c→b→a) will pass through only the first and the second lenses 11, 21.

The light shield 3 also serves as a beam limiter for the light incident upon the first lens surfaces 11a. Specifically, each of the through-holes 30 of the light shield 3 is appropriately deep so that unduly slanted light beams (see the ones indicated by n1 in FIG. 7) cannot pass through the through-holes 30 but are absorbed by the black inner wall surfaces 30a of the through-holes 30.

With the above arrangement, the light beam, once allowed to enter the first lens 11 via the first lens surface 11a, will not deviate farther away from the optical axis C as traveling through the lens 11. This is advantageous to avoiding the cross talk of light which would otherwise occur between one first lens 11 and another first lens 11, or between one second lens 21 and another second lens 21, or between one first lens 11 and a non-cooperative second lens 21. Due to the absence of the cross talk, a clear image of the object is obtained by the lens array unit U1.

In this connection, it should be noted that the diameters of the first to the fourth lens surfaces 11a–11b and 21a–21b are non-decreasing (in diameter, the surface 11a<the surface 11b=the surface 21a<the surface 21b, as previously mentioned). Thus, the light beam incident upon the first lens surface 11a will not miss any one of the second to the fourth lens surfaces 11b, 21a and 21b as it passes through the first and the second lens arrays 1 and 2. This guarantees that the light beam passing through the two lens arrays 1 and 2 will be refracted the expected number of times (four times in the illustrated embodiment), which contributes to the creation of a clear image of the object.

Figure 8:
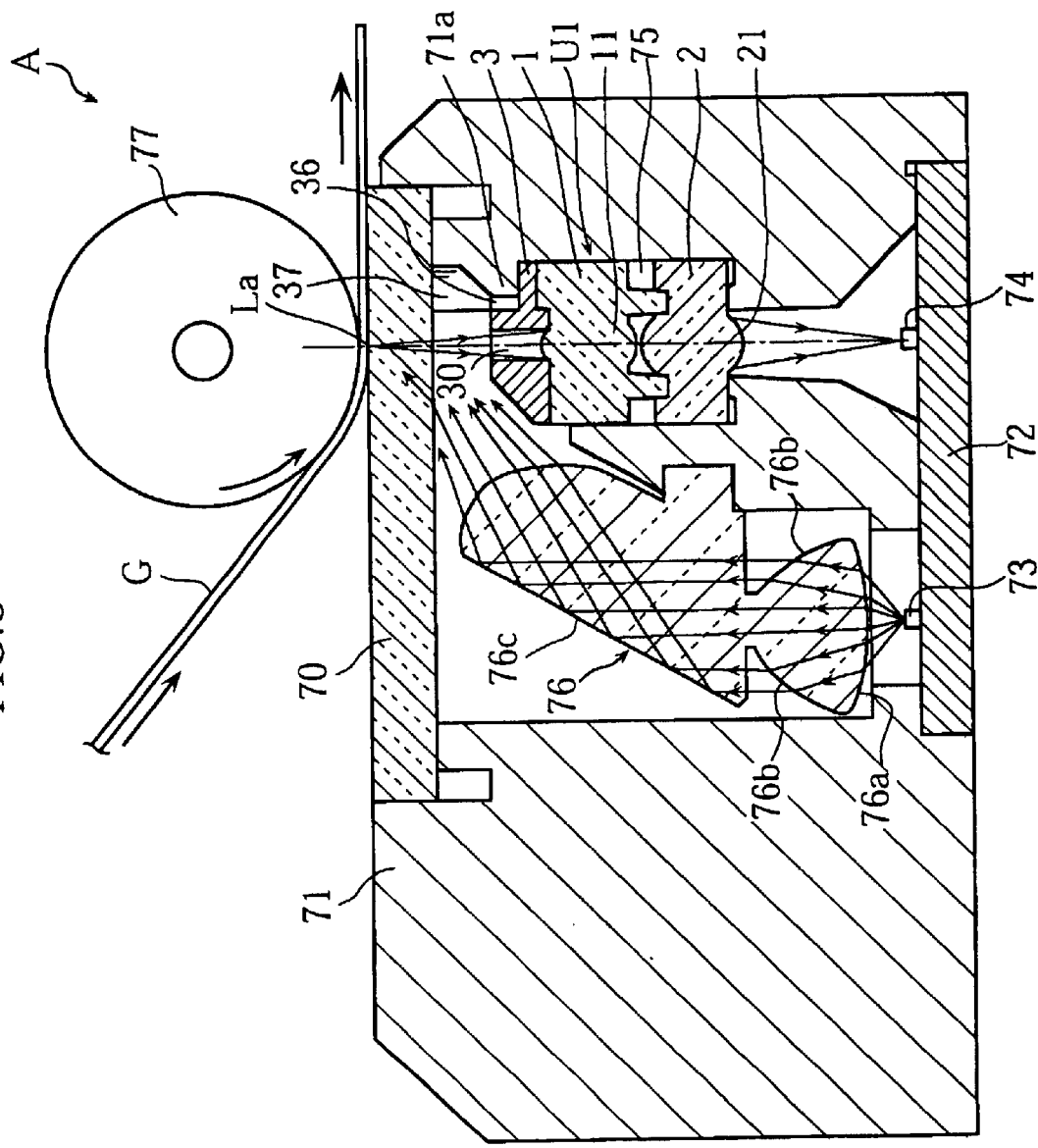
FIG. 8 is a sectional view showing the main components of an image reading apparatus incorporating the lens array unit of the first embodiment.

FIG. 8 shows the basic structure of an image reading apparatus incorporating the above-described lens array unit U1. The illustrated apparatus A includes a resin housing 71, a transparent platen plate 70 attached to the upper portion of the housing 71, and an insulating substrate 72 attached to the lower portion of the housing 71. The substrate 72 is provided on its upper surface with light sources 73 (e.g. light-emitting diodes) and light receiving elements 74. The light sources 73 and the light receiving elements 74 are arranged in parallel arrays each extending in the primary scanning direction (perpendicular to the surface of the paper). Upon receiving light, each of the light receiving elements 74 will output a signal (image signal) corresponding to the amount of the received light.

The lens array unit U1 is disposed between the platen plate 70 and the light receiving elements 74. The unit U1 is fitted into a positioning slit 75 of the housing 71 so that the array of the first and the second lenses 11, 21 extends in the primary scanning direction. The housing 71 is provided with a projection 71a to come into engagement with the recess 36 (see FIG. 2) of the light shield 3, whereby the light shield 3 is properly held in place in the housing 71. In addition, the upward projections 37 at the respective ends of the light shield 3 come into abutment with the lower surface of the platen plate 70, which is advantageous to preventing the light shield 3 from unduly warping.

In operation, the light emitted from the light sources 73 is led to the image reading line La by a light guide 76 accommodated in the housing 71, as shown in FIG. 8. The light guide 76 (made of e.g. PMMA or PC) is provided with light converging surfaces 76a and 76b by which the diverging light rays emitted from the light sources 73 are turned into generally parallel rays. Then, the parallel light beams are reflected on a slant surface 76c of the light guide 76, to be directed toward the image reading line La.

A document G to be read out is brought into sliding contact with the platen plate 70 by a platen roller 77. Along the image reading line La, the document G is illuminated by the light from the light sources 73. Then, the light reflected on the document G passes through the lenses of the lens array unit U1, to be focused onto the light receiving elements 74 in a non-inverting and non-magnifying manner. Accordingly, each of the light receiving elements 74 outputs an appropriate image signal based on which the original image carried on the document G is read out.

The above-described image reading apparatus A utilizes the lens array unit U1 which can be fabricated at a lower cost than the conventional lens array with the conventional self-focusing rod lenses. Thus, the price of the image reading apparatus A is advantageously lowered.

Figure 9:
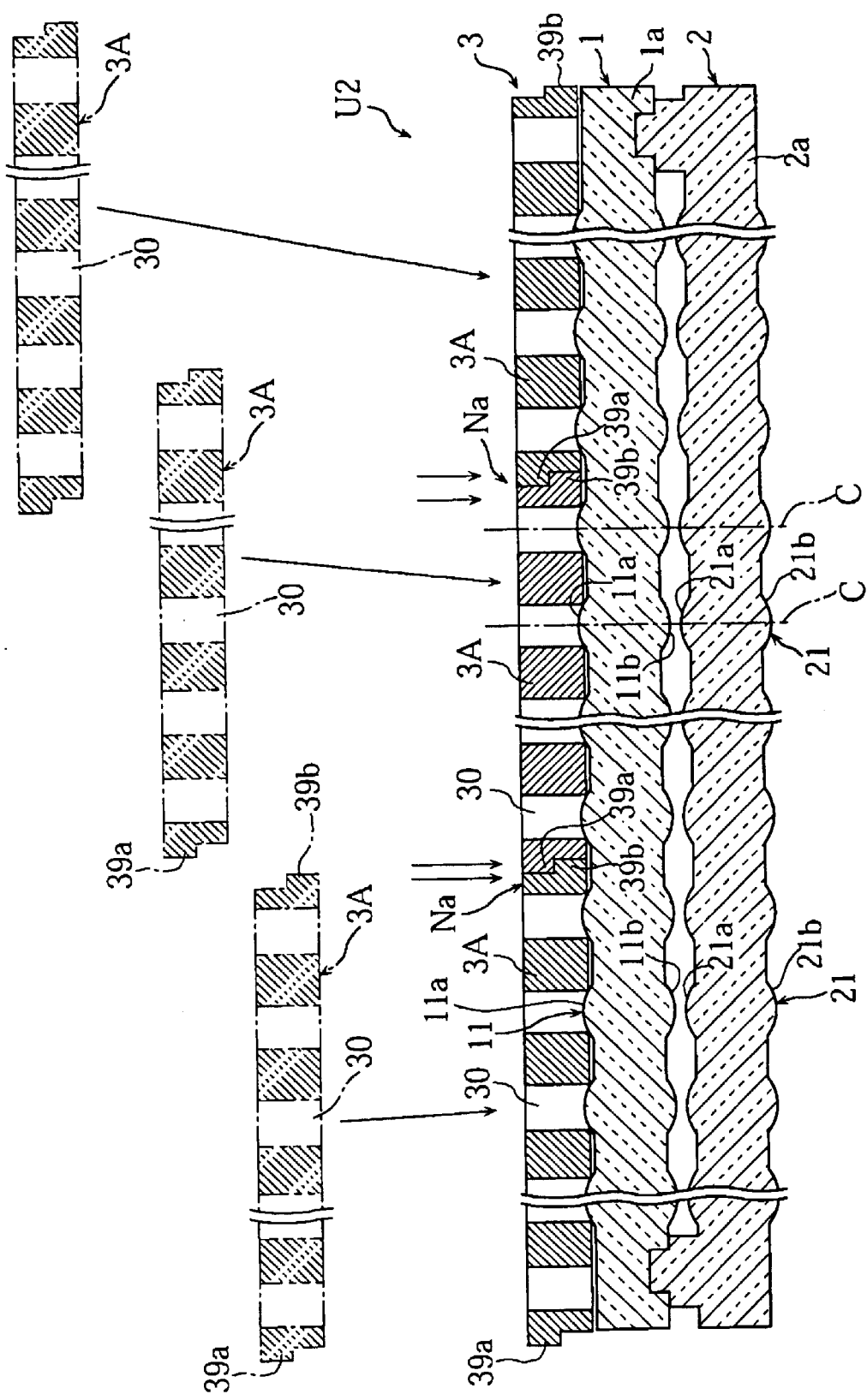
FIG. 9 is a sectional view showing a lens array unit according to a second embodiment of the present invention.
Figure 10:
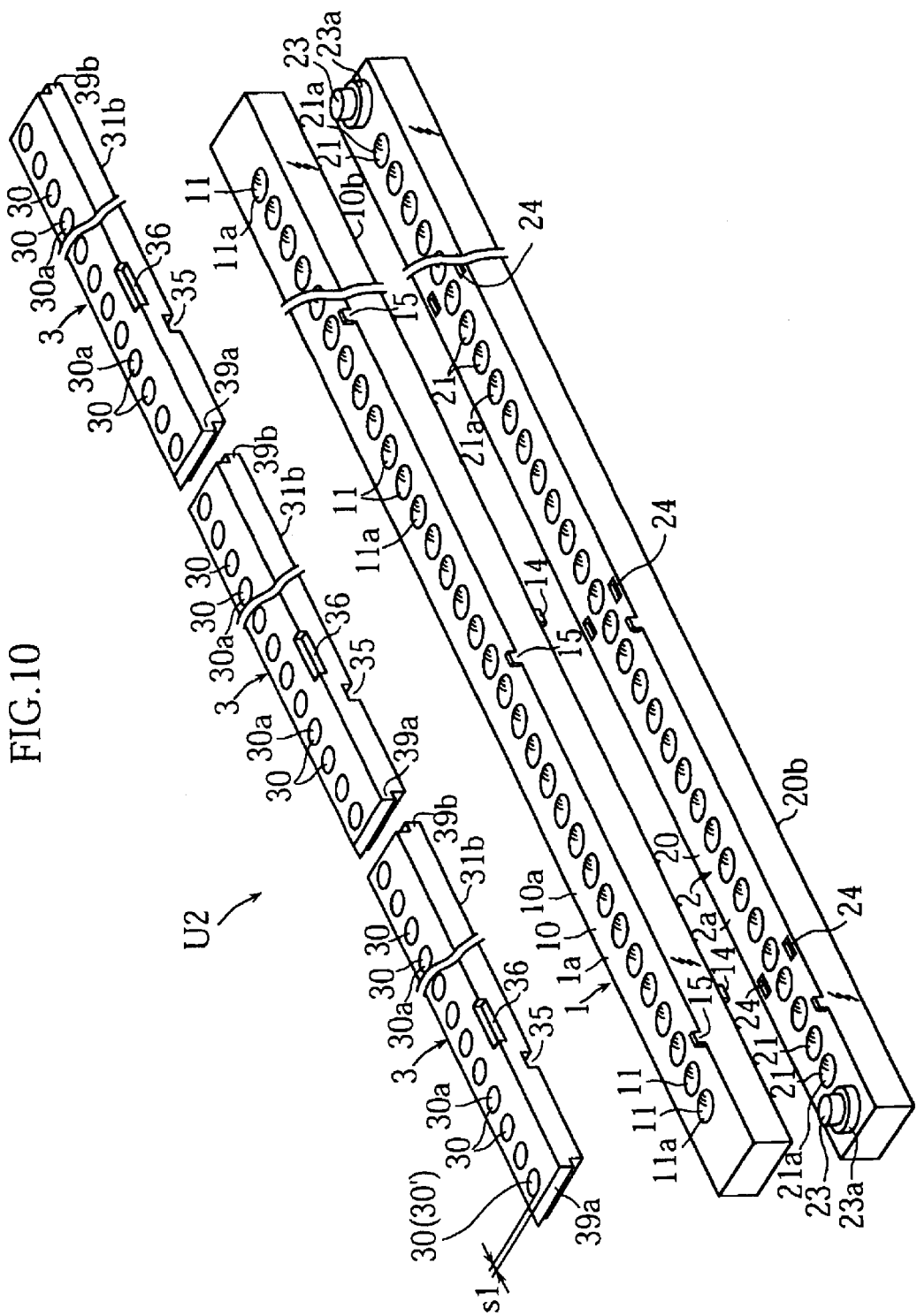
FIG. 10 is an exploded view showing the main components of the lens array unit of the second embodiment.

Referring now to FIGS. 9 and 10, a lens array unit U2 according to a second embodiment of the present invention will be described.

The lens array unit U2 is similar to the previous unit U1 except for the arrangement of the light shield 3. As shown in FIGS. 9 and 10, the light shield 3 of the second embodiment is not a one-piece component but consists of a plurality of cooperative light shielding segments 3A which are generally identical in size and configuration. Each of the light shielding segments 3A maybe made of a synthetic resin material such as polystyrene and its analog containing syndiotactic polystyrene. Each segment 3A is formed with an array of through-holes 30 arranged longitudinally of the segment, and also with first and second step portions 39a–39b at both ends. As shown in FIG. 9, the first step portion 39a of a light shielding segment 3A comes into snug engagement of the second step portion 39b of another light shielding segment 3A when these two segments 3A are combined. The two step portions 39a–39b project horizontally from the light shielding segments 3A, thereby overlapping with each other. Thus, when the two segments 3A are combined by the step portions 39a–39b, the joint Na between them does not allow the passage of light.

As shown in FIG. 10, each segment 3A is provided in its lower surface 31b with a recess 35 into which a positioning projection 15 formed on the first lens array 1 is fitted. With such an arrangement, all of the light shielding segments 3A are accurately arranged on the first lens array 1.

According to the second embodiment, each light shielding segment 3A is made shorter than the one-piece light shield 3 of the first embodiment. Thus, the respective segments 3A are less liable to warp, as compared to the light shield 3 of the first embodiment. Therefore, without being expanded before attached to the first lens array 1, the light shielding segments 3A are maintained in close engagement with the lens array 1. The needlessness of expansion means that the light shielding segments 3A can be made of a resin material exhibiting relatively high fluidity, such as the above-mentioned polystyrene material (in general, a material exhibiting high fluidity is less flexible once it solidifies). A fluid material is advantageous to forming the light shielding segments 3A by a molding technique.

Figure 11:
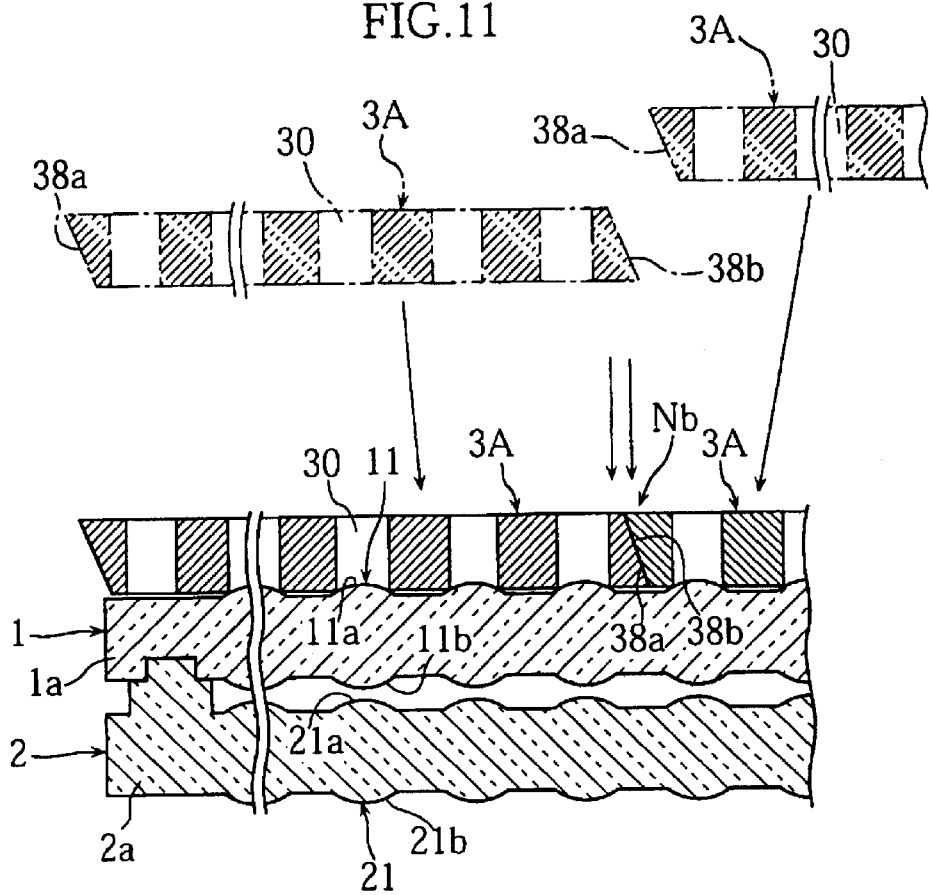
FIG. 11 is a sectional view showing one example of a modified version of the lens array unit of the second embodiment.

According to the present invention, the joint between two light shielding segments 3A may have different forms than the above-mentioned overlapping step configuration. For instance, as shown in FIG. 11, each of the light shielding segments 3A may be formed with two slant ends 38a–38b parallel to each other. In this manner again, the joint Nb of the neighboring segments 3A properly blocks the passage of light.

Figure 12A:
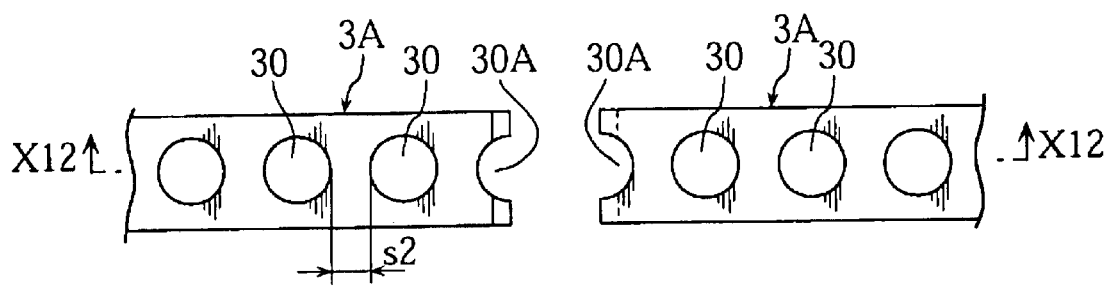
FIGS. 12A and 12B show another example of a modified version of the lens array unit of the second embodiment, wherein the FIG. 12B is a sectional view taken along lines X12—X12 in FIG. 12A.
Figure 12B:
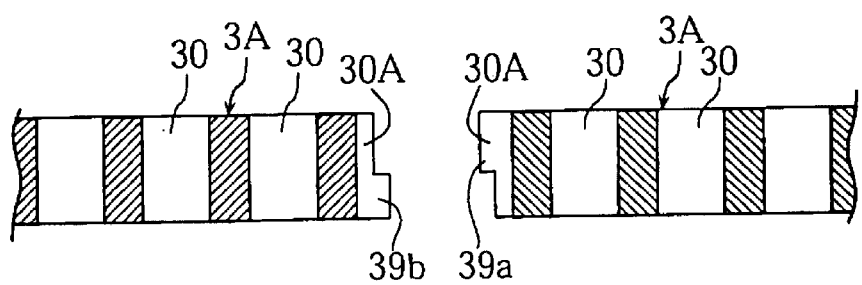

Another example is shown in FIGS. 12A–12B, in which the joint between the neighboring segments 3A is made at a through-hole 30. In this case, a semi cylindrical surface 30A is formed in each end of any one of the light shielding segments 3A, as shown in FIG. 12A, with an upper or lower step portion 39a, 39b provided adjacent to the semi cylindrical surface 30A. When connected, the two semi cylindrical surfaces 30A form one complete through-hole 30 at the joint of the two light shielding segments 3A. This arrangement is advantageous when the distance s2 between two through-holes 30 is so small that it is difficult to make a separation between them.

Figure 13:
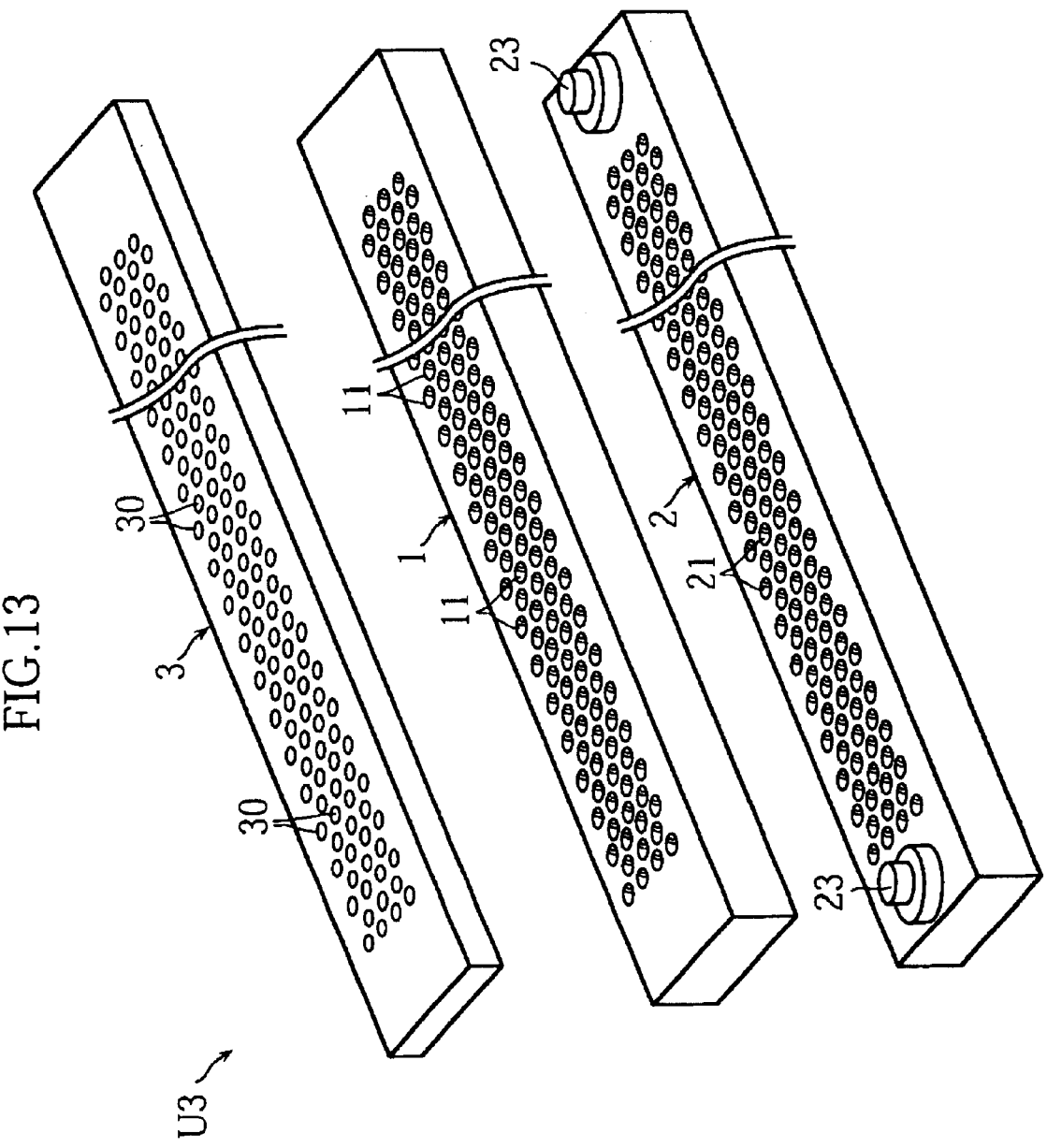
FIG. 13 is an exploded view showing the main components of a lens array unit according to a third embodiment of the present invention.

FIG. 13 shows a lens array unit U3 according to a third embodiment of the present invention. In the unit U3, the first lens array 1 is provided with first lenses 11 arranged in a plurality of rows, while the second lens array 2 is provided with second lenses 21 arranged in the same pattern as the first lenses 11. The light shield 3 is formed with a plurality of through-holes 30 corresponding in position to the first and the second lenses 11, 21. The second lens array 2 is formed with upward positioning projections 23 fitted into cooperative holes (not shown) formed in the first lens array 1. With the use of the lens array unit U3, a non-inverted and non-magnified image of an object is projected more brightly than a single-row lens array unit as shown in FIG. 2 or FIG. 10.

Figure 14:
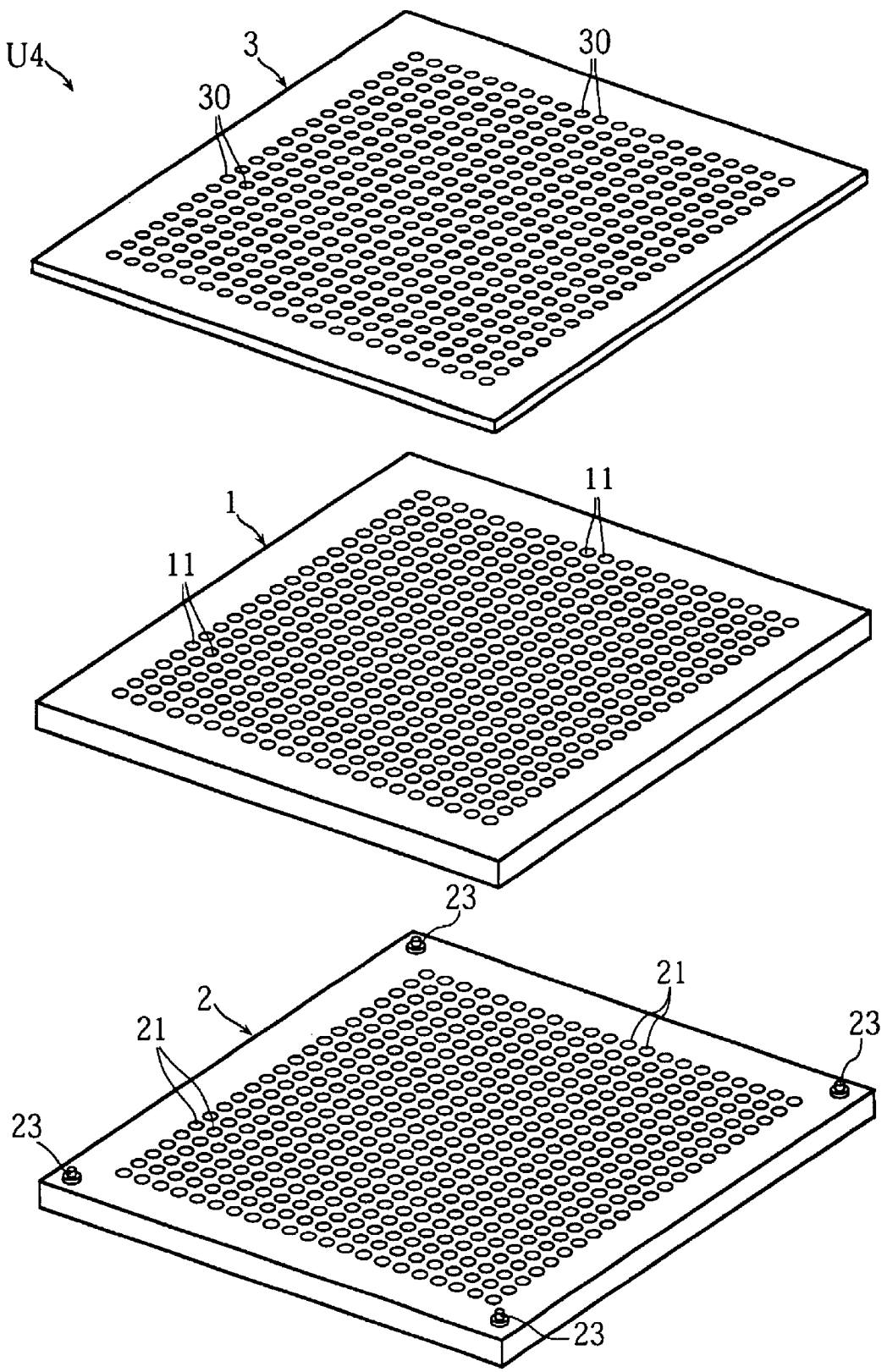
FIG. 14 is an exploded view showing the main components of a lens array unit according to a fourth embodiment of the present invention.

FIG. 14 shows a lens array unit U4 according to a fourth embodiment of the present invention. In the unit U4, a plurality of first and second lenses 11, 21 are disposed in a matrix pattern in the first and the second lens arrays 1, 2. Accordingly, the light shield 3 is formed with a plurality of through-holes 30 corresponding in position to the first and the second lenses 11, 21. Four upward positioning projections 23 are provided at the four corners of the second lens array 2, to be fitted into four cooperative holes (not shown) formed in the first lens array 1. The illustrated lens array unit U4 is advantageously used in e.g. a liquid crystal display for projecting the image of an object in a non-inverting and non-magnifying manner.

Figure 15:
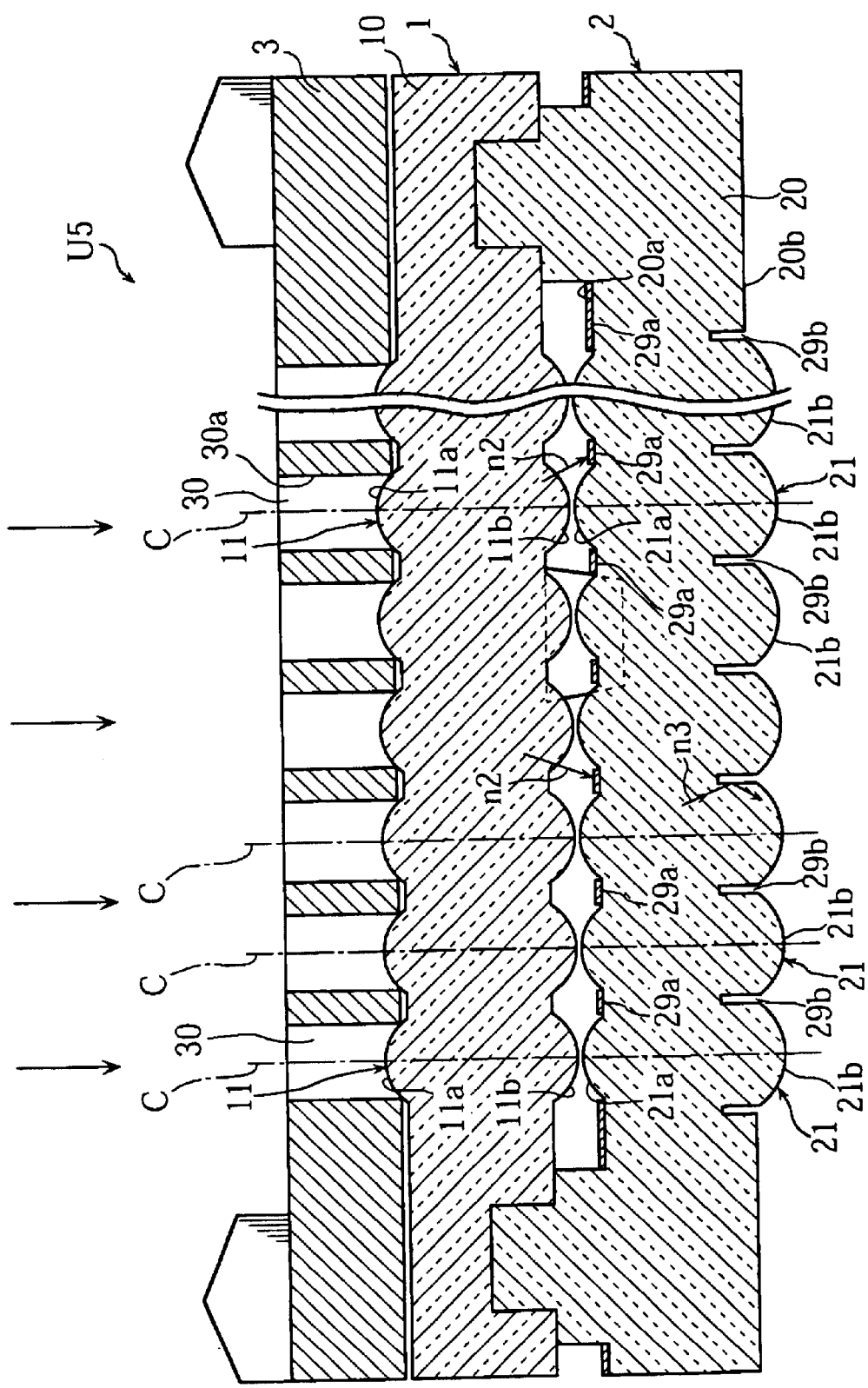
FIG. 15 is a sectional view showing a lens array unit according to a fifth embodiment of the present invention.

Reference is now made to FIG. 15 illustrating a lens array unit U5 according to a fifth embodiment of the present invention. As seen from the comparison between FIG. 15 and FIG. 1, the lens array unit U5 of the fifth embodiment is basically similar to the unit U1 of the first embodiment except for the following points.

As shown in FIG. 15, the lens array unit U5 is provided with a light shielding layer 29a formed on the upper surface 20a of the second holder 20. Further, the lower surface 20b of the second holder 20 is formed with a plurality of grooves 29b for partially separating the second lenses 21 from each other.

With the use of the light shielding layer 29a, the unfavorable of cross talk of light between the lenses 11 or 21 is more reliably provided than when only the light shield 3 is provided on the first lens array 1. In addition, the lens separation grooves 29b cause the light to be totally reflected on a lower part of each second lens 21, as indicated by an arrow n3, which serves to preventing the cross talk of light between the second lenses 21.

According to the present invention, such a light shielding layer and/or lens separation grooves as the ones described above may also be formed in the first lens array 1.

Figure 16:
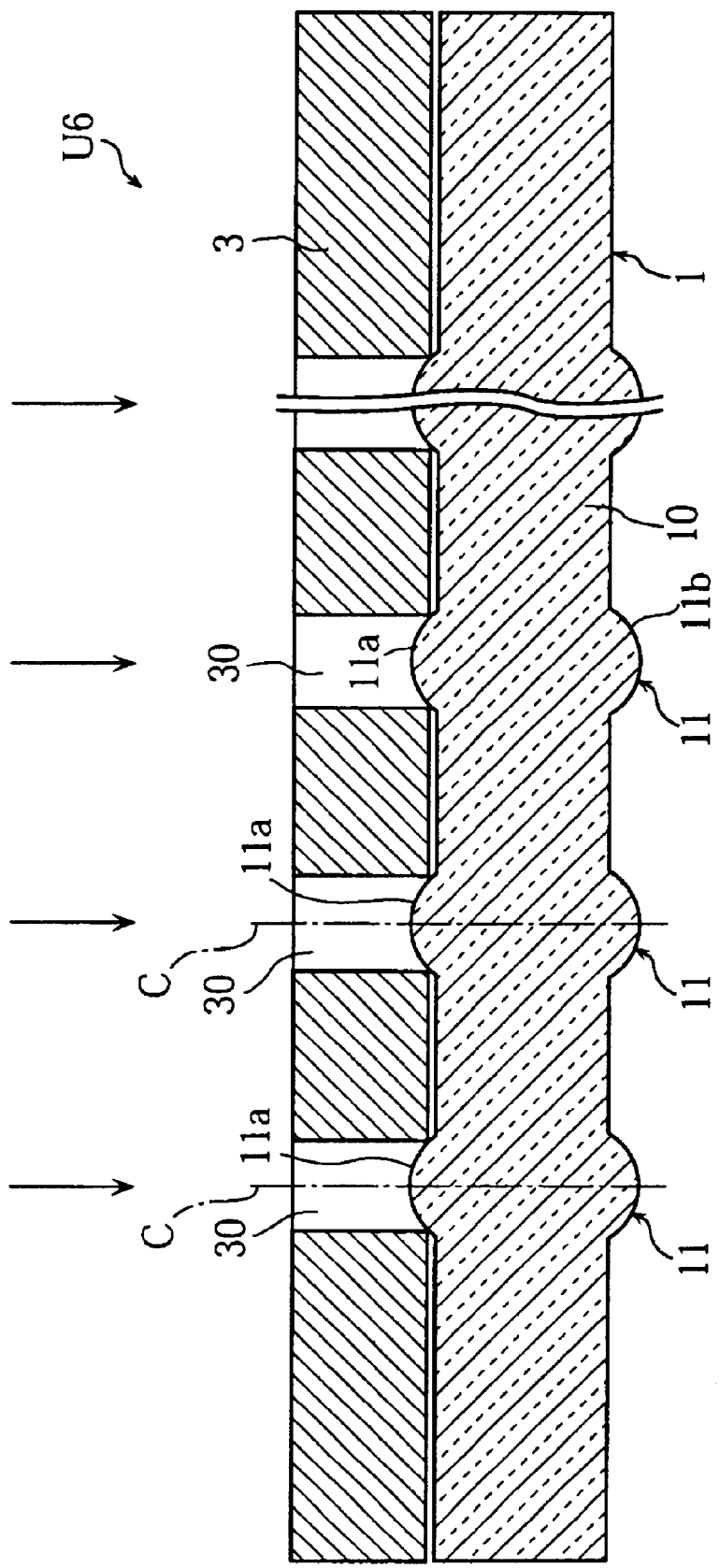
FIG. 16 is a sectional view showing a lens array unit according to a sixth embodiment of the present invention.

FIG. 16 shows a lens array unit U6 according to a sixth embodiment of the present invention. The unit U6 includes a single lens array 1 to be used with a light shield 3. The lens array 1 is provided with a plurality of lenses 11 each having a convex first lens surface 11a and a convex second lens surface 11b. The lens array 1 is also provided with a holder 10 formed integral with the lenses 11. With the use of the lens array unit U6, an inverted and contracted image of an object can be projected.

In the above-described first to sixth embodiments, one or two lens arrays are used for providing a lens array unit, though the present invention is not limited to this. For instance, a third lens array with a plurality of concave lenses may be inserted between first and second lens arrays for the purposes of eliminating a chromatic aberration. Such a lens array unit is advantageously used for a color image reading apparatus.

FIGS. 17–21 show a lens array unit U7 according to a seventh embodiment of the present invention. The unit U7 includes a first lens array 1 and a second lens array 2 cooperative with the first lens array 1. For enabling proper positioning, the second lens array 2 is provided with a pair of projections 23 to be fitted into holes 13 formed in the first lens array 1. The first and the second lens arrays 1, 2 may be made of PMMA or PC.

The first lens array 1 is provided with a plurality of first lenses 11 integral with a transparent first holder 10. Each of the first lenses 11 has a convex first lens surface 11a and a convex second lens surface 11b. The diameter of the first lens surface 11a may be 0.60 mm, while the diameter of the second lens surface 11b may be 0.81 mm (thus, the second lens surface 11b is diametrically greater than the first lens surface 11a). Similarly, the second lens array 2 is provided with a plurality of second lenses 21 integral with a transparent second holder 20. Each of the second lenses 21 has a convex third lens surface 21a and a convex fourth lens surface 21b. The diameter of the third lens surface 21a may be 0.84 mm, while the diameter of the fourth lens surface 21b may be 0.95 mm (thus, the fourth lens surface 21b is diametrically greater than the third lens surface 21a, which in turn is diametrically greater than the second lens surface 11b of the first lens array 1).

Figure 17:
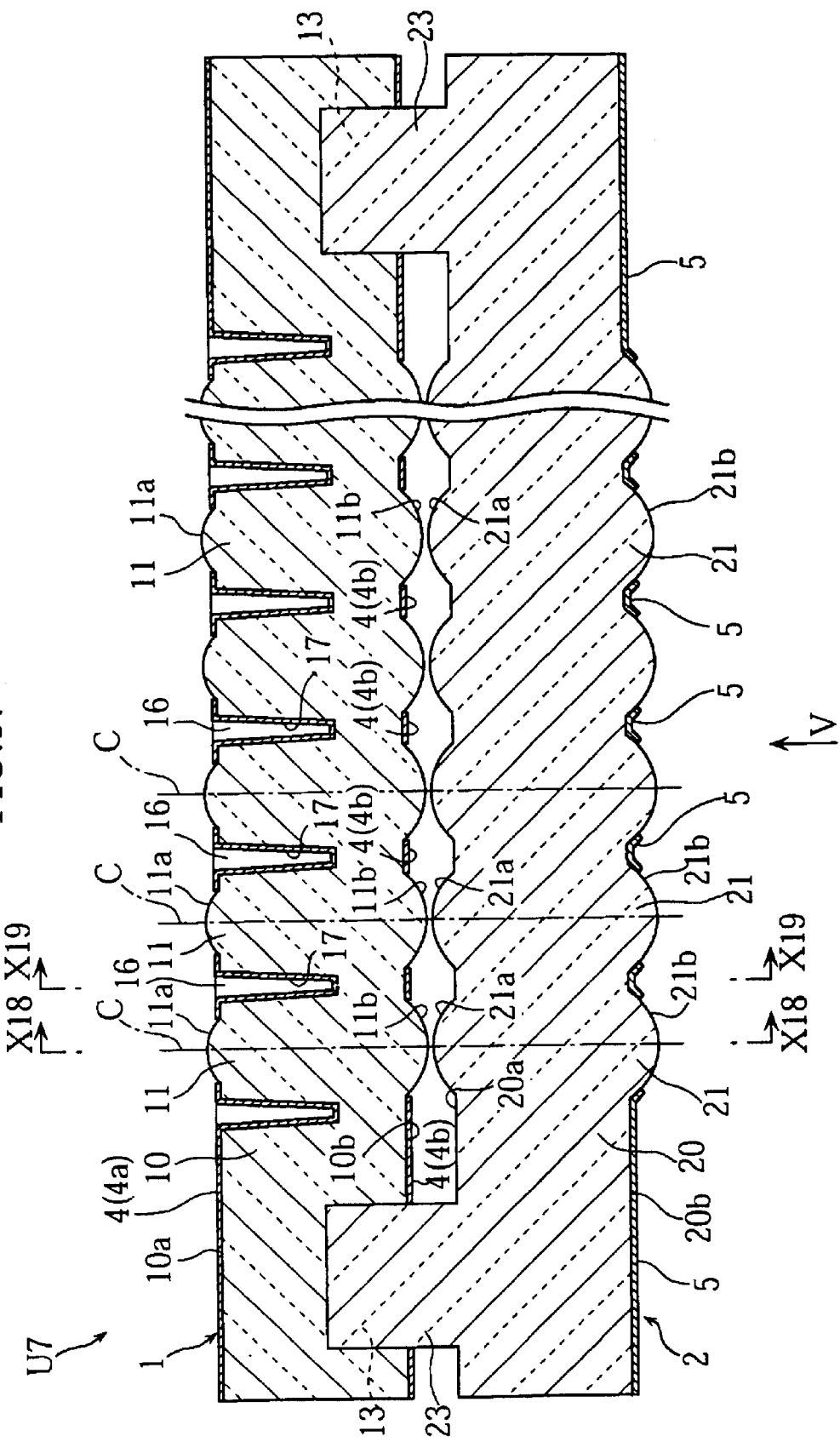
FIG. 17 is a sectional view showing a lens array unit according to a seventh embodiment of the present invention.
Figure 19:
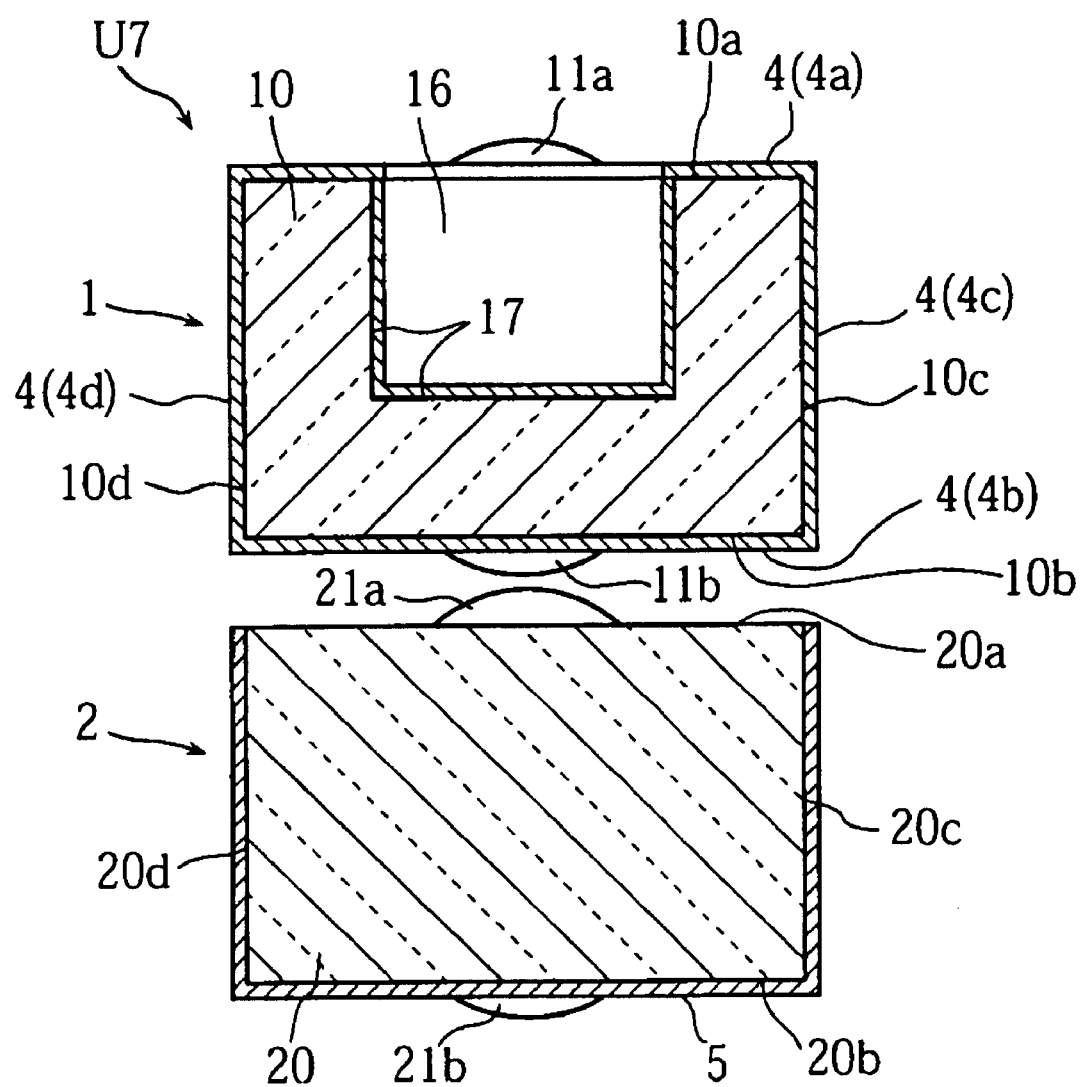
FIG. 19 is a sectional view taken along lines X19—X19 in FIG. 17.
Figure 20:
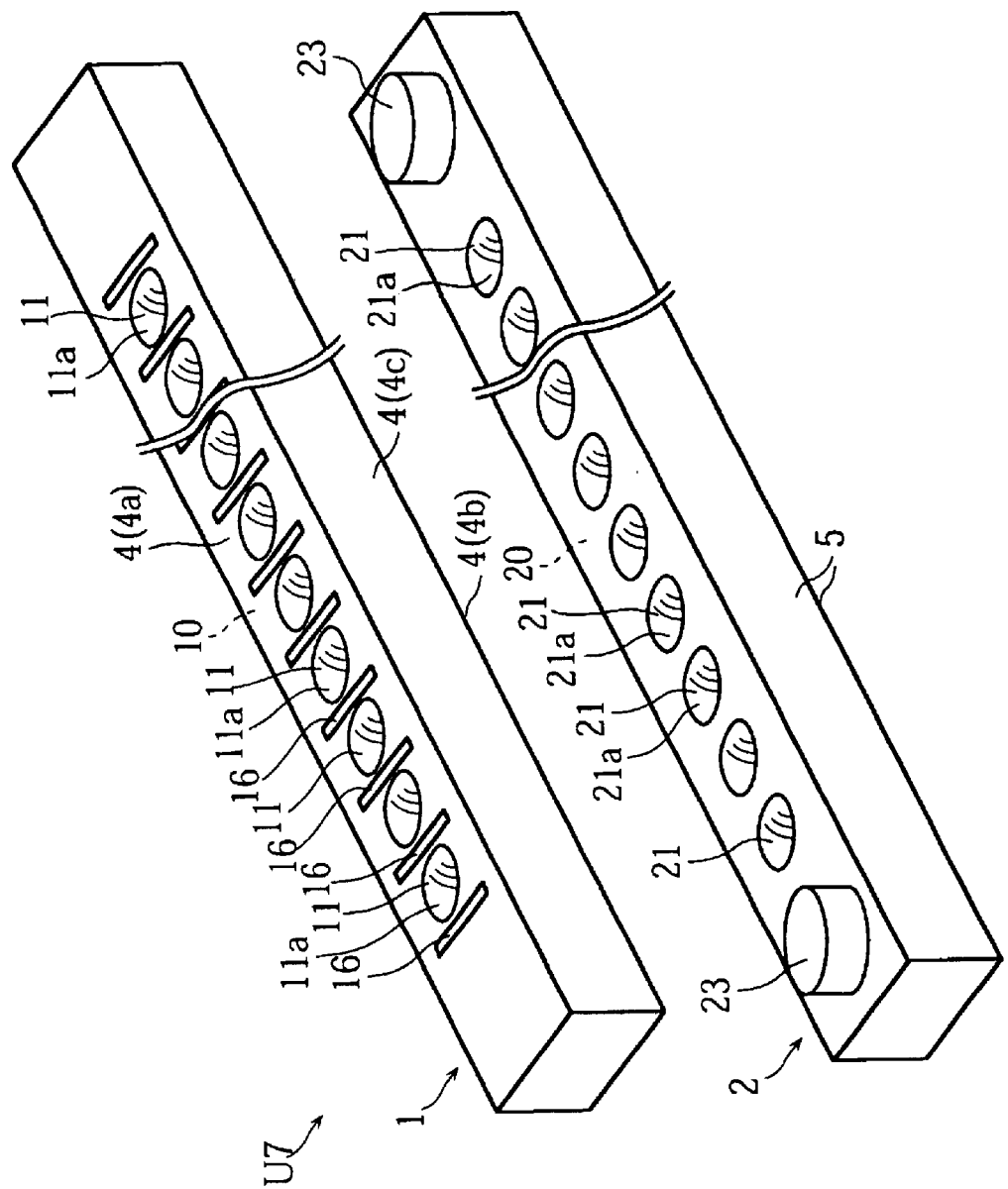
FIG. 20 is an exploded view showing the main components of the lens array unit of the seventh embodiment.

As shown in FIGS. 17 and 20, the first lens array 1 of the unit U7 is formed with a plurality of upwardly open separation grooves 16 arranged alternately with the first lenses 11. As seen from FIGS. 18 and 19, the width of each groove 16 is greater than the diameter of the first lens 11, while the depth of the groove 16 is smaller than the thickness (the vertical dimension) of the first lens array 1. As shown in FIGS. 17 and 19, the inner wall surfaces of each groove 16 are covered with a dark-colored (preferably black) light shielding layer 17. In the illustrated embodiment, the separation grooves 16 are formed in the upper surface 10a of the holder 10, though the present invention is not limited to this. For instance, similar separation grooves may be formed in the lower surface 10b of the holder 10, in addition to or in place of the illustrated grooves 16.

Figure 18:
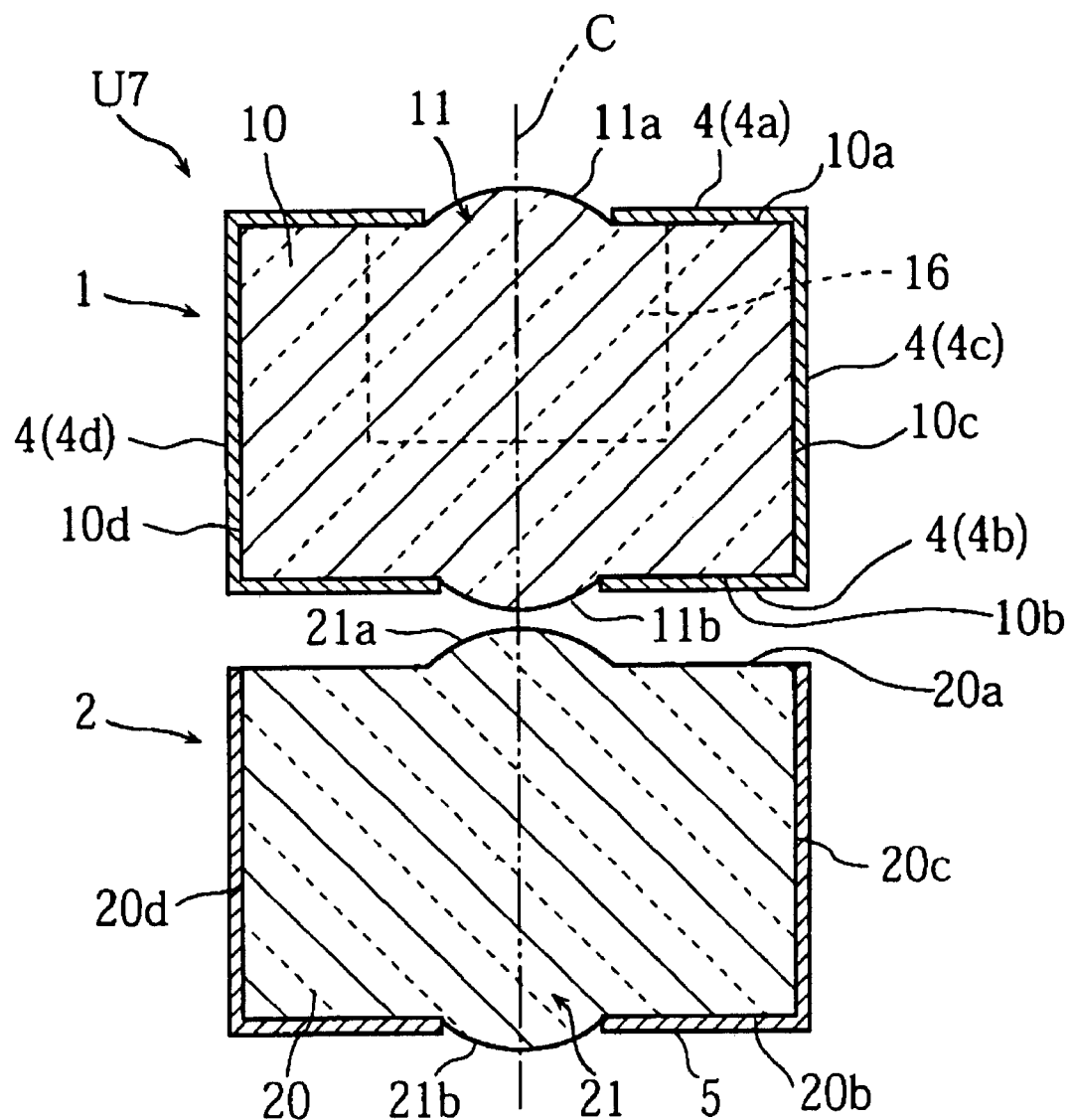
FIG. 18 is a sectional view taken along lines X18—X18 in FIG. 17.

As shown in FIGS. 18 and 19, the first holder 10 is covered with a light shielding layer 4 similar or identical in material to the above-mentioned layer 3 provided in the separation groove 16. Precisely, the layer 4 includes first through four portions 4a–4d for covering, respectively, the upper surface 10a, the lower surface 10b, one side surface 10c and the other side surface 10d. The first portion 4a does not cover the first lens surfaces 11a, and the second portion 4b does not cover the second lens surfaces 11b.

The upper surface 20a of the second holder 20 is provided with no light shielding layer. On the other hand, the lower surface 20b and the two side surfaces 20c, 20d are covered with a black light shielding layer 5.

Figure 21:
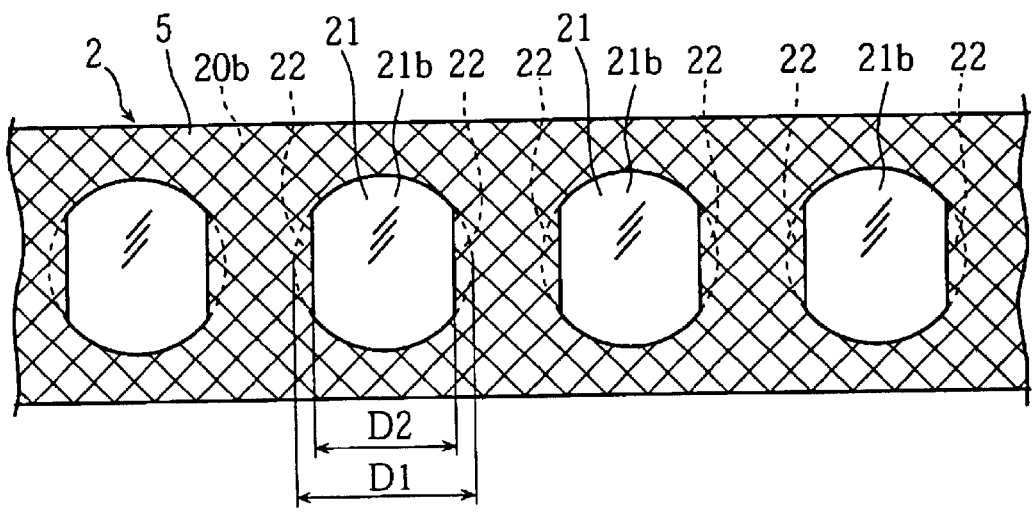
FIG. 21 shows the aperture configuration of a light shielding layer formed on the lower lens array of the lens array unit of the seventh embodiment.

Referring to FIG. 21, the light shielding layer 5 may partially cover each of the fourth lens surfaces 21b. In the illustrated example, the layer 5 covers the crescent portions 22 of each surface 21b which are spaced from each other in the longitudinal direction of the second lens array 2. Thus, the dimension D2 of each lens surface 21b measured in the longitudinal direction is smaller than the diameter D1 of the lens surface 21b.

Figure 22:
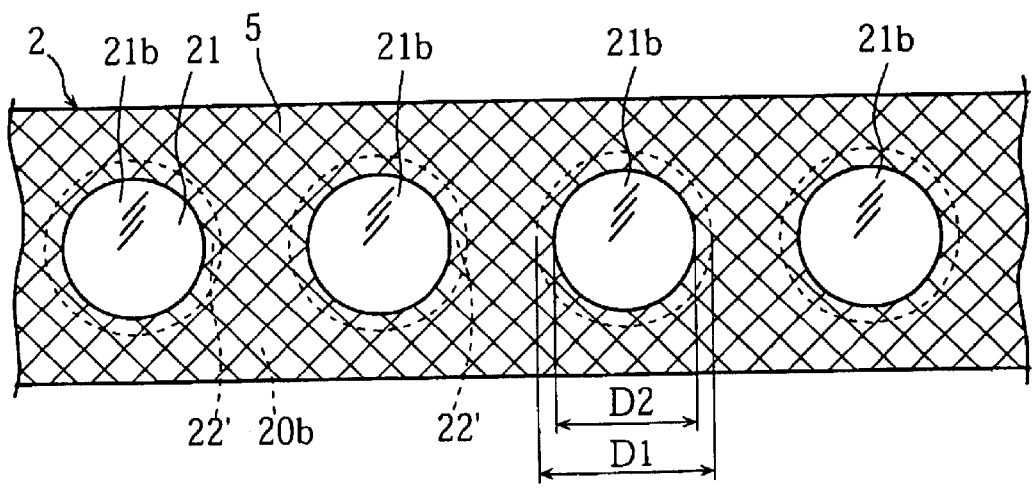
FIG. 22 shows an example of a modified aperture configuration of the light shielding layer of FIG. 21.

The lens covering manner shown in FIG. 21 is not limitative. For instance, as shown in FIG. 22, the entire circumferential portion 22' of each lens surface 21b may be covered with the light shielding layer 5.

Figure 23:
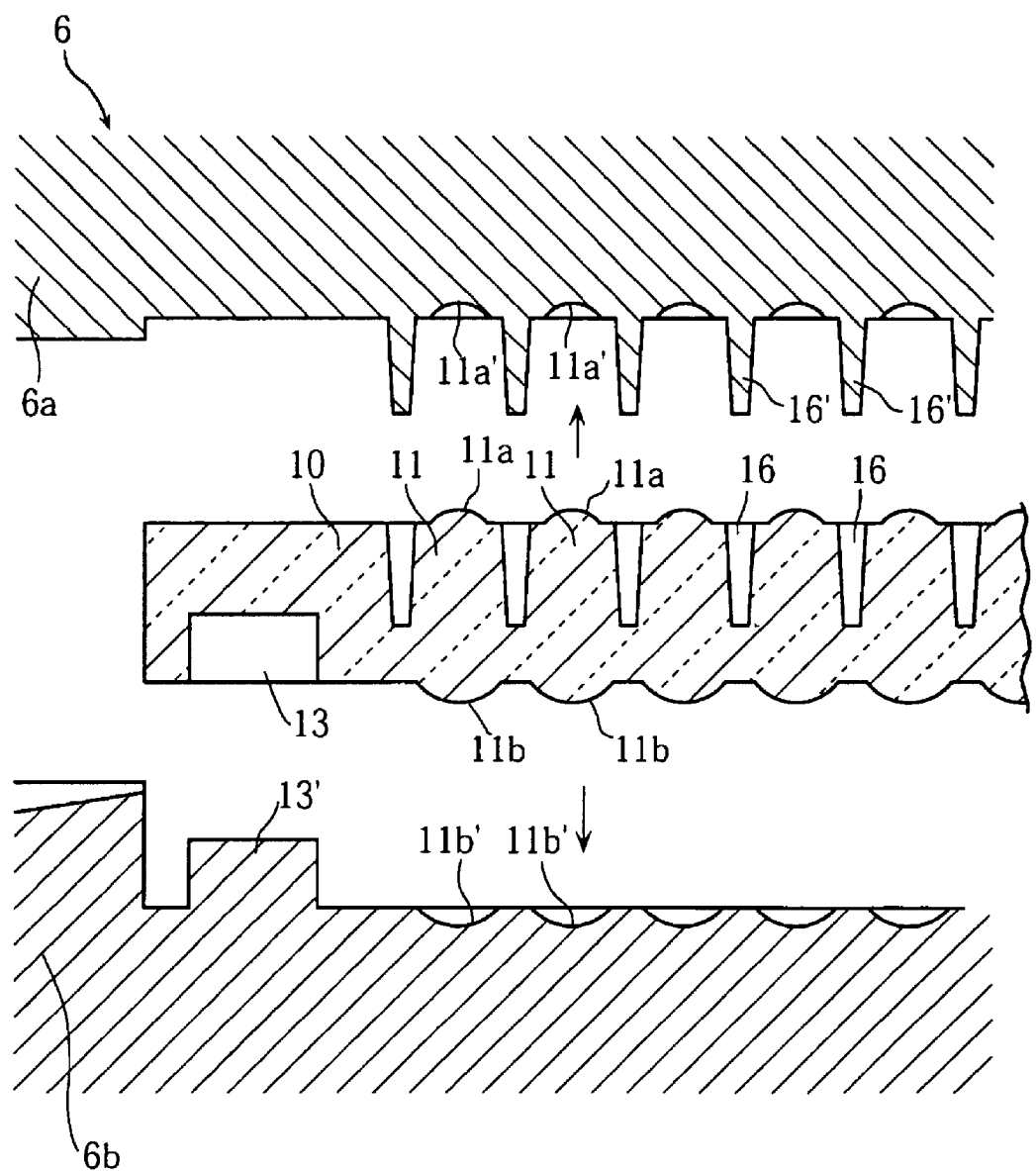
FIG. 23 illustrates how the transparent body of a lens array of the seventh embodiment is fabricated.

The transparent body of the above-described first lens array 1 may be fabricated by a molding technique using a resin material, as shown in FIG. 23, using an upper molding member 6a and a lower molding member 6b. The upper member 6a is provided with a plurality of downward projections 16' and concaves 11a' which correspond to the separation grooves 16 and the first lens surfaces 11a, respectively. The lower member 6b is provided with upward projections 13' and concaves 11b' which correspond to the positioning holes 13 and the second lens surfaces 11b, respectively. As readily understood, the transparent body of the second lens array 2 may be fabricated by using an appropriate mold.

After the transparent resin body is produced, the light shielding layers 30, 4 or 5 may be formed on it by using appropriate masking for preventing the desired portion of each lens surface from being covered with applied paint, or by using an inkjet printer capable of applying paint only to a desired portion. In the latter case, no masking may be needed.

Figure 24:
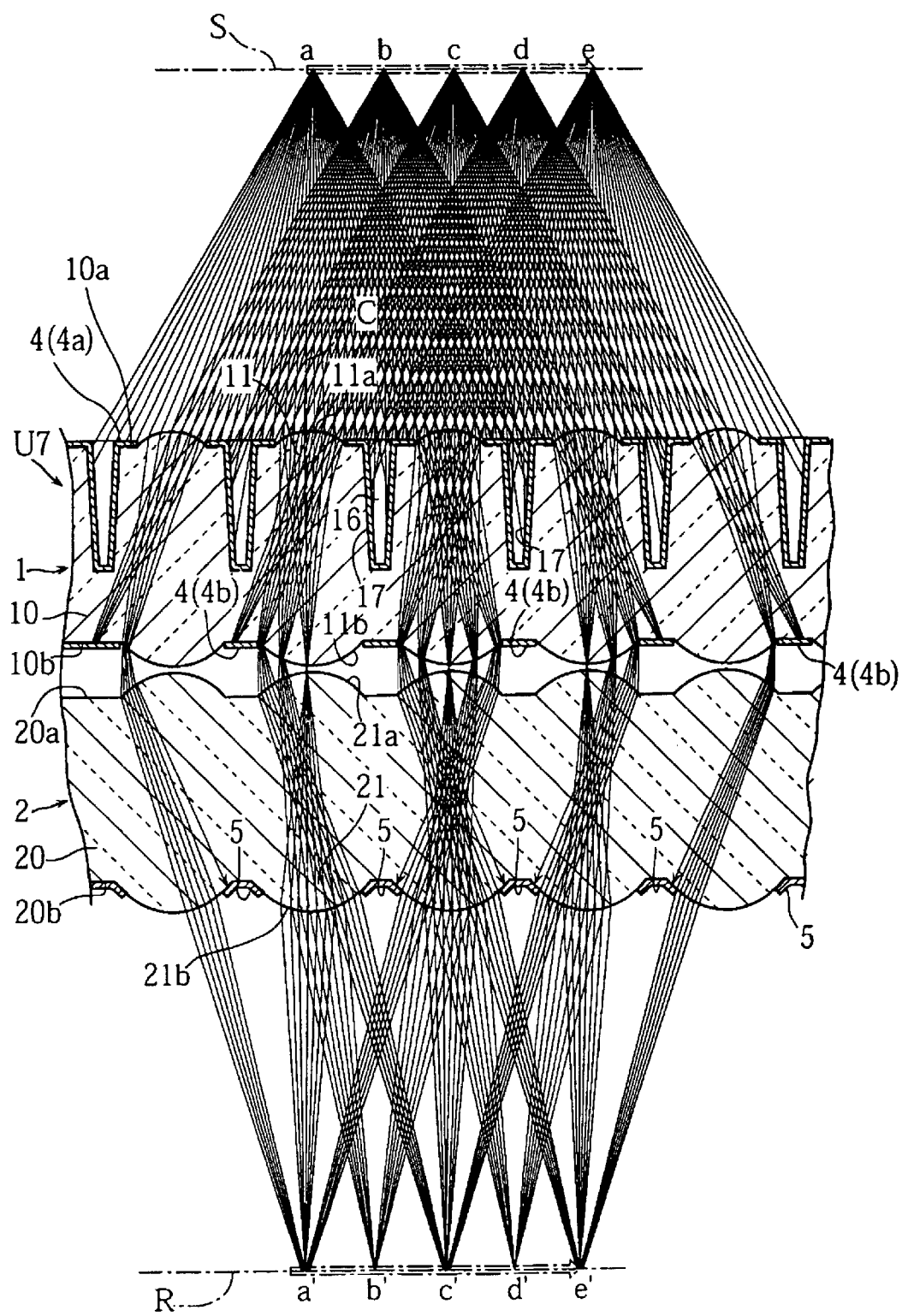
FIG. 24 illustrates the function of the lens array unit of the seventh embodiment.

FIG. 24 illustrates the paths of the light beams focused by the lens array unit U7. As shown, the image of an object (a→b→c→d→e) laid at a point S is projected onto the position R in a non-inverting and non-magnifying manner. In other words, the projected image (a'→b'→c'→d'→e') is oriented in the same direction as the object (a→b→c→d→e), and the size of the projected image is equal to that of the object at the point S.

In the lens array unit U7, the light reflected on the object (a→b→c→d→e) and directed toward the upper surface 10a of the holder 10 is blocked by the light shielding layer 4(4a). Thus, the light coming from the object enters the first lens array 1 via only the first lens surfaces 11a. The cross talk of light between the adjacent first lenses 11 is prevented by the light shielding layer 17 provided at each separation groove 16, and the emission of stray light beams toward the second lens array 2 from the first lens array 1 is checked by the light shielding layer 4b formed on the lower surface 10b. As a result, the light beams coming from the object (a→b→c→d→e) will properly interact with the first and the second lenses 11, 21 in the expected manner. It should be noted here that the lower surface 20b of the second lens array 2 is covered with the light shielding layer 5, thereby ensuring that the light beams passing through the unit U7 are allowed to go out only via the fourth lens surfaces 21b of the second lenses 21, which is advantageous to forming a clear image of the object.

Figure 25:
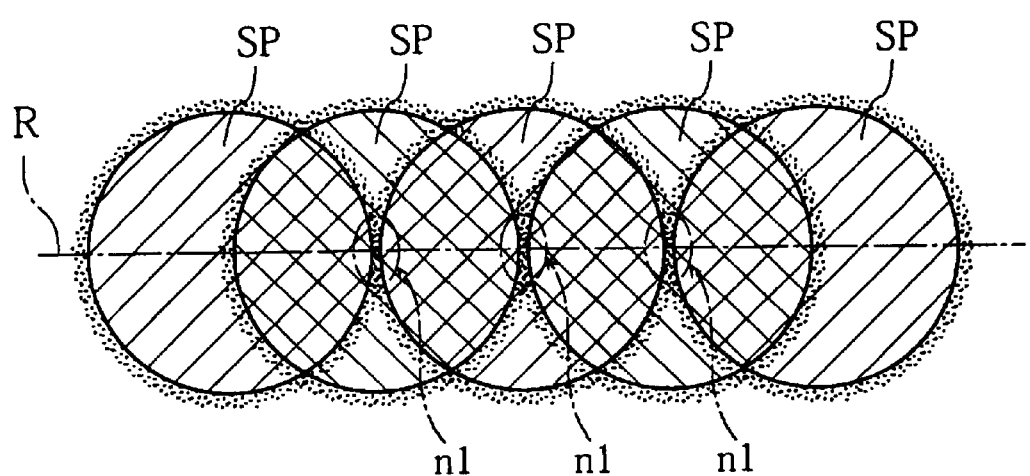
FIG. 25 illustrates how the light spots overlap with each other along the focal line.

Referring to FIG. 25, the light beams passing through the fourth lens surfaces 21b form a plurality of bright spots SP in a mutually overlapping manner along the focal line R (note that the actual outlines of the spots SP are not so clearly defined as depicted, but blur to some extent). Without taking any countermeasures, the small regions n1 appearing at regular intervals along the focal line R would be unduly brighter (due to the overlapping of three light spots SP) than the other regions on the line R (where only two light spots SP overlap), even if a monochromatic object to be read out is uniformly illuminated with the light from the light source.

According to the seventh embodiment of the present invention, however, the light shielding layer 5 covers the crescent portions 22 of each fourth lens surface 21b, as previously described with reference to FIG. 21. By limiting the aperture of each fourth lens surface 21b in this manner, each light spot SP can be made smaller along the focal line R. As a result, the brightness of the respective regions n1 is substantially equalized with that of the other regions along the line R. Thus, a true image of the object is obtained.

Figure 26:
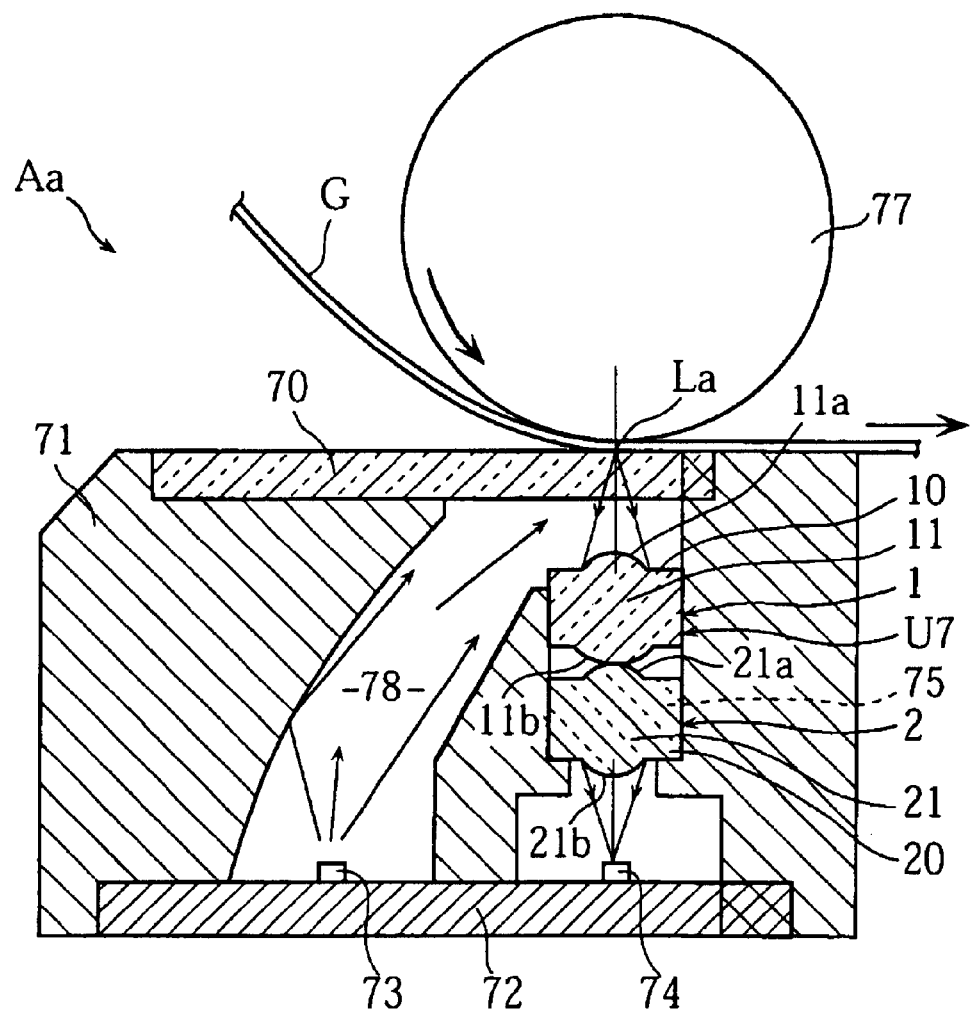
FIG. 26 is a sectional view showing the main components of an image reading apparatus incorporating the lens array unit of the seventh embodiment.

FIG. 26 shows an image reading apparatus Aa incorporating the above-described lens array unit U7. The illustrated apparatus Aa includes a transparent platen plate 70, a resin housing 71, and an insulating substrate 72. A plurality of light sources 73 (e.g. LEDs) and an array of light receiving elements 74 are mounted on the substrate 72. The lens array unit U7 is fitted into a positioning groove 75 formed in the housing 71 between the platen plate 70 and the light receiving elements 74. Differing from the previous image reading apparatus A shown in FIG. 8, the apparatus Aa of FIG. 26 is not provided with a light guiding component (corresponding to the light guide 76 of the apparatus A). Instead, the housing 71 of the apparatus Aa is internally formed with a light guiding passage 78 defined by reflective wall surfaces of the housing 71.

Figure 27:
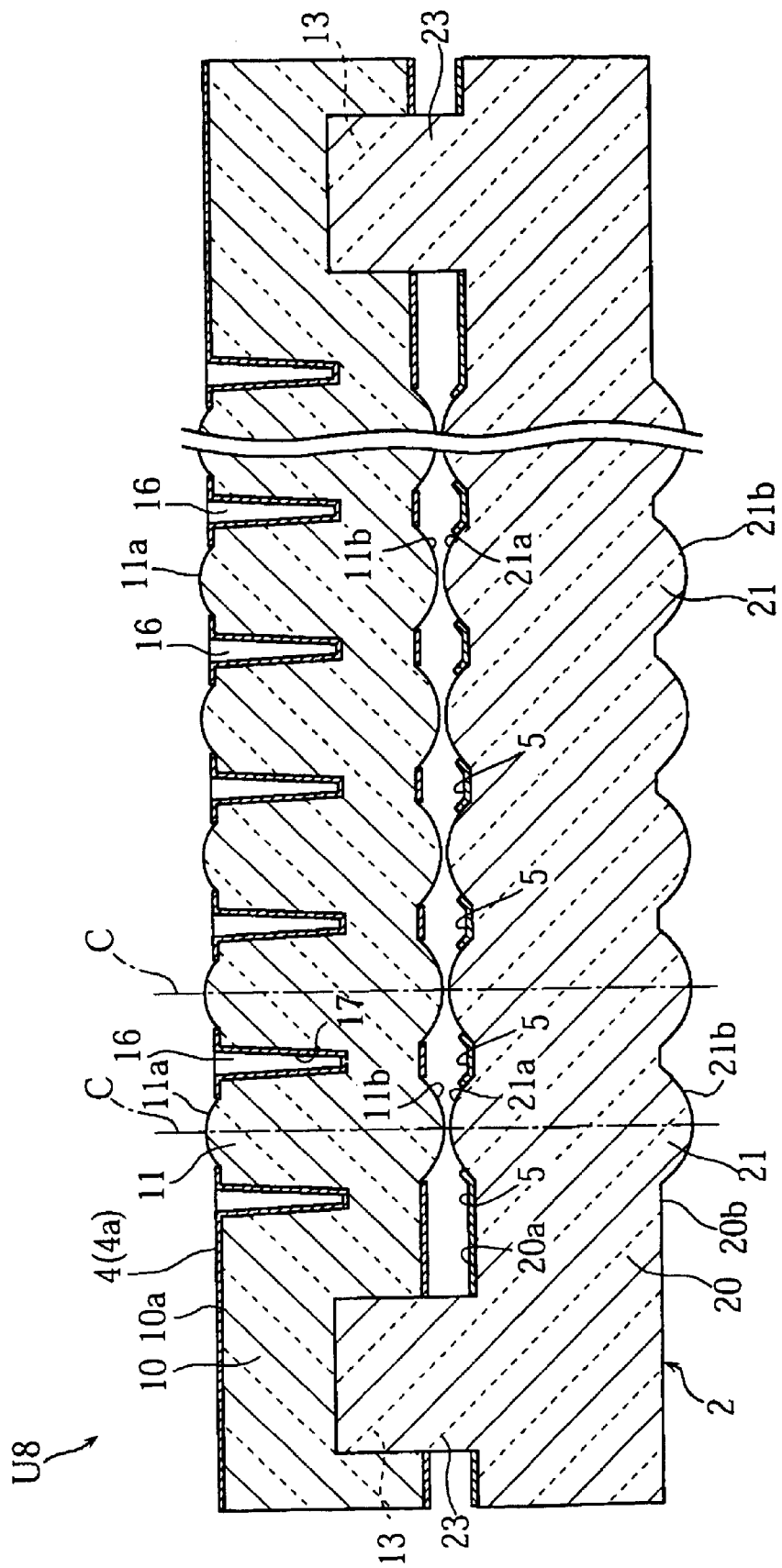
FIG. 27 is a sectional view showing a lens array unit according to an eighth embodiment of the present invention.
Figure 28:
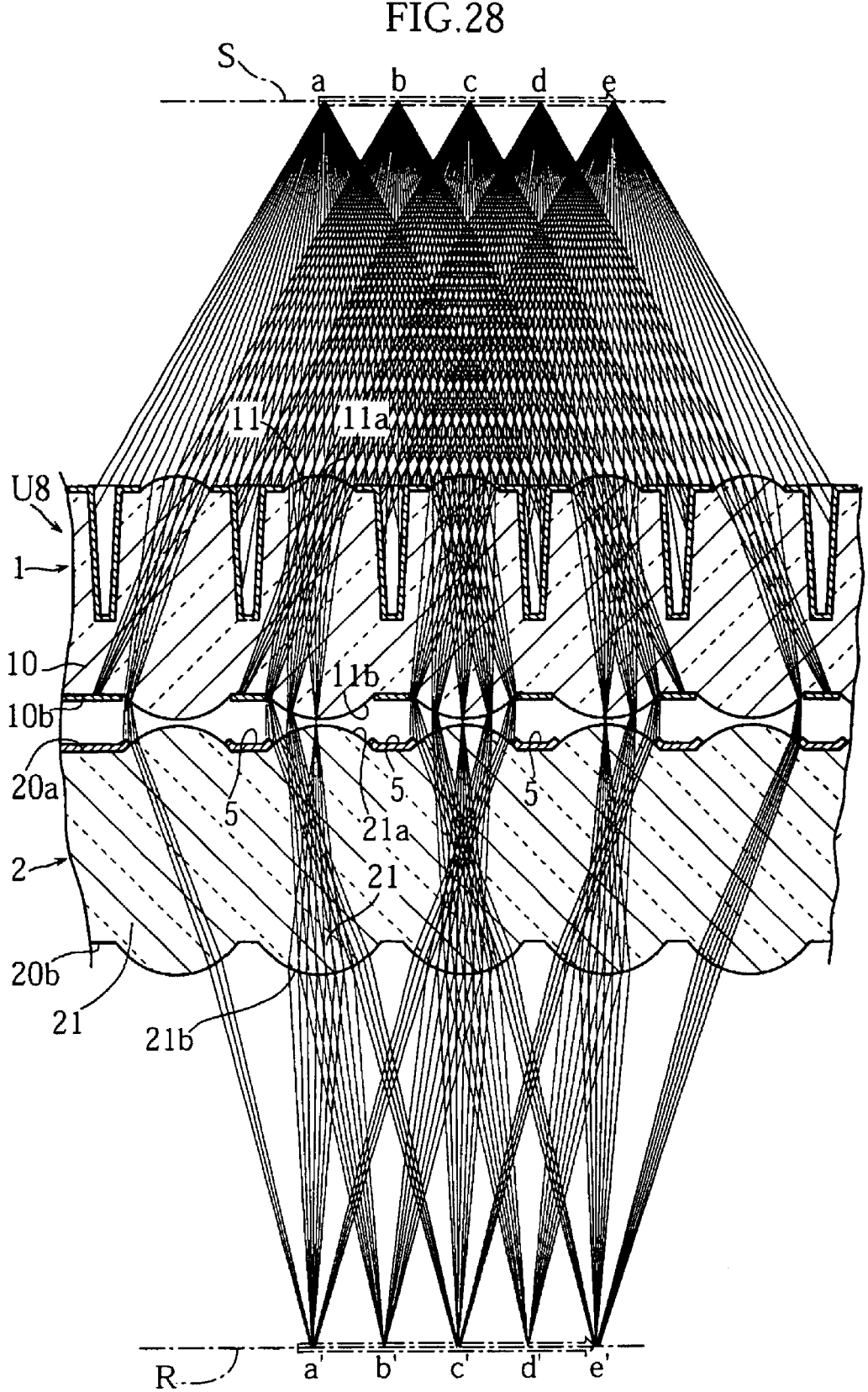
FIG. 28 illustrates the function of the lens array unit of the eighth embodiment.
Figure 29:
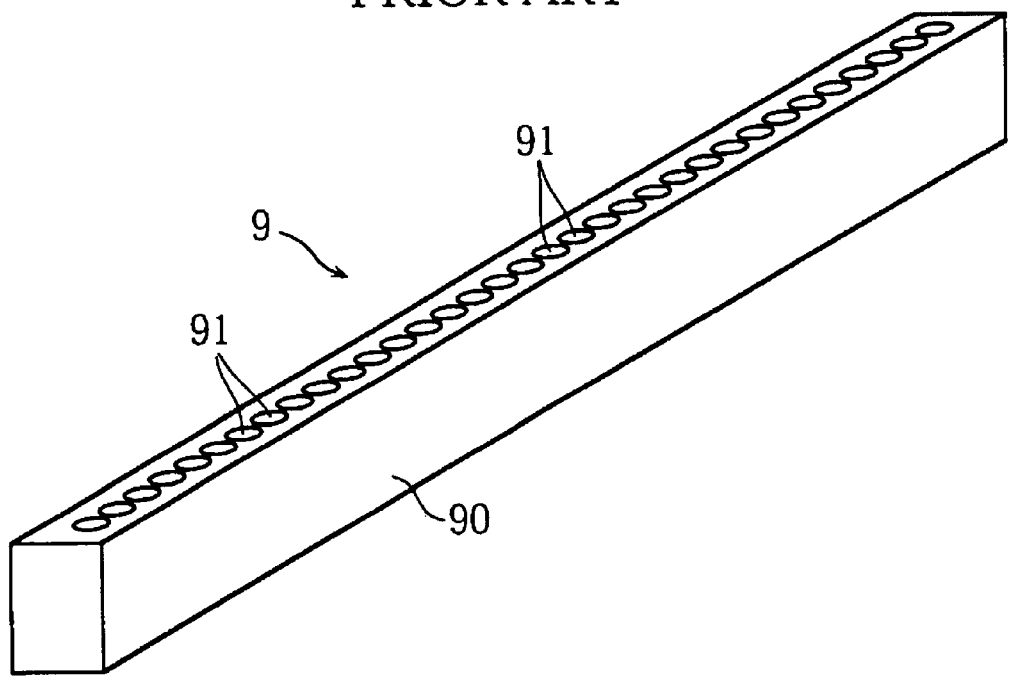
FIG. 29 is a perspective view showing a conventional self-focusing rod lens array.
Figure 30:
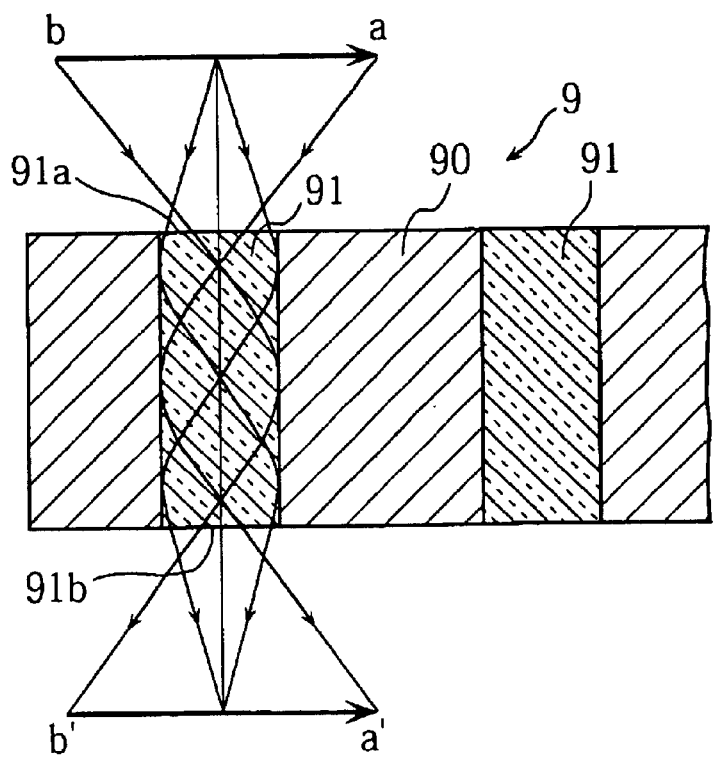
FIG. 30 is an enlarged sectional view illustrating the function of the conventional rod lens.

FIG. 27 shows a lens array unit U8 according to an eighth embodiment of the present invention. The illustrated unit U8 is basically similar to the previous unit U7 shown in FIG. 17 except that the light shielding layer 5 is provided on the upper surface 20a of the second lens array 2 but not on the lower surface 20b of the array 2. The light shielding layer 5 partially covers the third lens surface 21a of each second lens 21 in the same manner as depicted in FIG. 21. Thus, substantially uniform brightness is obtained along the predetermined focal line, as described with reference to FIG. 25. FIG. 28 illustrates the paths of the light beams which are reflected on the object (a→b→c→d→e) and focused onto the focal line R by the lens array unit U8.

According to the present invention, the first or second lens surface (11a or 11b) of the first lenses 11 may be partially covered by a light shield for the purposes of limiting the aperture of the lens surface.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A lens array unit comprising:
a first lens array provided with a plurality of first convex lenses and a first transparent holder formed integral with the first lenses, each of the first lenses having first and second lens surfaces, each of the first lens surfaces being convex and having a predetermined apex height;
a second lens array provided with a plurality of second convex lenses and a second transparent holder formed integral with the second lenses, each of the second lenses having third and fourth lens surfaces, the second lens array being separate from the first lens array and attached to the first lens array so that the third lens surfaces face the second lens surfaces; and
a light shield mounted on the first lens array and provided with a plurality of through-holes facing the first lens surfaces, the light shield having a thickness greater than the apex height of each said first lens surface;

wherein the light shield is located on a side of the first lens array located away from the second lens array.

2. The lens array unit according to claim 1, wherein the first and second lens surfaces of the first lens array are convex in opposite directions, the third and fourth lens surfaces of the second lens array being also convex in opposite directions.

3. The lens array unit according to claim 1, wherein each of the through-holes has a dark-colored inner wall surface.

4. The lens array unit according to claim 3, wherein the light shield is made of a dark-colored resin material.

5. The lens array unit according to claim 1, wherein the light shield and the first lens array are provided with engaging means including a recess and a projection fitted into the recess.

6. The lens array unit according to claim 1, wherein the light shield is attached to the first lens array in a stretched state.

7. The lens array unit according to claim 1, wherein the light shield includes a plurality of segments connected to extend in a predetermined direction.

8. The lens array unit according to claim 7, wherein adjacent ones of the segments overlap with each other in a thickness direction perpendicular to said predetermined direction.

9. The lens array unit according to claim 7, wherein the segments are equal in configuration and size to each other.

10. The lens array unit according to claim 1, wherein each of the first lens surfaces is convex and at least partially projects into a relevant one of the through-holes of the light shield.

11. The lens array unit according to claim 1, wherein the first lens surfaces are diametrically greater than the through-holes of the light shield.

12. A lens array unit comprising:

a lens array provided with a plurality of lenses and a transparent holder formed integral with the lenses, each of the lenses having a first convex lens surface for incidence of light and a second lens surface, each of the first convex lens surfaces having a predetermined apex height; and a light shield formed with a plurality of through-holes facing the first lens surfaces, the light shield having a thickness greater than the apex height of each said first lens surface;

wherein the light shield is arranged on a side of the lens array where the first convex lens surfaces are formed.

13. A lens array unit comprising:

a first lens array provided with a plurality of first convex lenses arranged in a line, each of the first lenses having first and second lens surfaces, the first lens array including a flat surface from which the first lens surfaces project, the first lens array also including grooves extending from the flat surface toward the second lens surfaces for optically separating the first lenses from each other;

a second lens array provided with a plurality of second convex lenses arranged in a line, each of the second lenses having third and fourth lens surfaces, at least either one of the third and fourth lens surfaces being convex, the second lens array being separate from the first lens array and attached to the first lens array so that the third lens surfaces face the second lens surfaces;

first light shielding means covering the flat surface of the first lens array and extending into each of the grooves; and second light shielding means for partially covering said at least either one of the third and the fourth lens surfaces of each second lens which is convex.

14. The lens array unit according to claim 13, wherein the second light shielding means comprises a dark-colored layer formed directly on said at least one of the third and the fourth lens surfaces of each second lens.

15. The lens array unit according to claim 13, wherein the first shielding means is dark-colored.

16. The lens array unit according to claim 13, wherein each of the first and the second lens arrays is provided with a holder formed integral with the convex lenses.

17. A lens array comprising:

a plurality of lenses arranged in a line and each having a convex lens surface;

a transparent holder formed integral with the lenses and having a flat surface from which the convex lens surface project, the holder also including grooves extending from the flat surface into a wall thickness of the holder for optically separating the lenses from each other; and light shielding means covering the flat surface of the holder and extending into each of the grooves.

* * * * *